(12) United States Patent
Gupta et al.

(10) Patent No.: US 11,606,741 B2
(45) Date of Patent: Mar. 14, 2023

(54) METHOD TO ENHANCE WLAN CONNECTION BASED ON ACTIVITY RECOGNITION

(71) Applicant: MOTOROLA MOBILITY LLC, Chicago, IL (US)

(72) Inventors: Ranjeet Gupta, Naperville, IL (US); Santhosh Kumar Gillella, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 133 days.

(21) Appl. No.: 16/858,604

(22) Filed: Apr. 25, 2020

(65) Prior Publication Data
US 2021/0337464 A1 Oct. 28, 2021

(51) Int. Cl.
| | | |
|---|---|---|
| *H04W 4/00* | (2018.01) | |
| *H04W 48/16* | (2009.01) | |
| *H04W 48/20* | (2009.01) | |
| *H04W 52/28* | (2009.01) | |
| *H04W 4/02* | (2018.01) | |
| *H04W 88/06* | (2009.01) | |
| *H04W 84/12* | (2009.01) | |

(52) U.S. Cl.
CPC ........... *H04W 48/16* (2013.01); *H04W 4/025* (2013.01); *H04W 48/20* (2013.01); *H04W 52/285* (2013.01); *H04W 84/12* (2013.01); *H04W 88/06* (2013.01)

(58) Field of Classification Search
CPC ..... H04W 48/16; H04W 48/20; H04W 4/025; H04W 52/285; H04W 64/00; H04W 36/30; H04W 36/18; H04W 36/08; H04W 36/14; H04W 36/12; H04W 36/32; H04M 11/04
USPC .................................. 370/328; 455/436, 440
See application file for complete search history.

(56) References Cited

U.S. PATENT DOCUMENTS

| | | | |
|---|---|---|---|
| 2015/0350972 A1* | 12/2015 | Rao ........................ | H04W 36/32 455/441 |
| 2016/0205238 A1* | 7/2016 | Abramson ........... | G08G 1/0137 455/456.4 |
| 2017/0171833 A1* | 6/2017 | Vamaraju ............... | H04W 48/16 |
| 2017/0188287 A1* | 6/2017 | Robbins ................ | H04W 16/14 |
| 2020/0163029 A1* | 5/2020 | Frenger ................... | H04L 29/08 |

\* cited by examiner

*Primary Examiner* — Temica M Beamer
(74) *Attorney, Agent, or Firm* — Isidore PLLC

(57) ABSTRACT

A wireless communication device includes at least one wireless communication transceiver, and a processor coupled to the transceiver. The processor executes program code that enables the device to: determine whether the wireless communication device is camped within a coverage area of an accessible wireless connection point while the wireless communication device is in motion. The program code further enables the wireless communication device to: in response to determining the wireless communication device is camped within the coverage area of an accessible wireless connection point, selectively connect the transceiver to the accessible wireless connection point. The program code further enables the wireless communication device to: in response to determining the wireless communication device is not camped within the coverage area of an accessible wireless connection point, defer connecting the transceiver to the accessible wireless connection point.

20 Claims, 7 Drawing Sheets

METHOD TO ENHANCE WLAN CONNECTION BASED ON ACTIVITY RECOGNITION

BACKGROUND

1. Technical Field

The present disclosure generally relates to wireless communication systems, and more particularly to selectively connecting to a wireless local area network (WLAN) based on activity recognition.

2. Description of the Related Art

Wireless fidelity (WiFi) hotspots are becoming more common in public spaces. Meanwhile, WiFi access points are becoming more powerful, enabling coverage areas to stretch farther from the access point. In order to offload data communications from cellular networks and to reduce cellular data service charges, conventional mobile devices have been designed to connect to a WiFi network whenever possible. When a user is walking, running, cycling, or otherwise in motion across multiple WiFi hotspot overage areas, the mobile device is able to quickly connect to and then disconnect from the different WiFi networks provided by the respective WiFi hotspot coverage areas, as the device enters and exits the WiFi hotspot coverage area. However, while the user is in motion, such connections are generally functionally unusable.

In order to improve data connectivity experience, recent mobile devices have been designed to avoid connection to WiFi networks when the user is in motion. This implementation involves the mobile devices detecting the context (e.g., walking, running, cycling, in-vehicle, etc.) of the device and accordingly avoiding connection to WiFi networks while the device is in motion. People in everyday life visit the gym to walk on a treadmill or do cycling on an indoor exercise bike where the gym offers free WiFi to customers. People also commute via train or car and/or travel on a moving cruise vessel, where the vehicle incorporates a WiFi access point that provides WiFi to passengers. In such cases, although the WiFi network provided by the gym/vehicle is relatively stationary relative to the mobile device, the mobile device will detect that the user is on-the-go and will avoid connecting to Wi-Fi networks based on the motion of the device.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
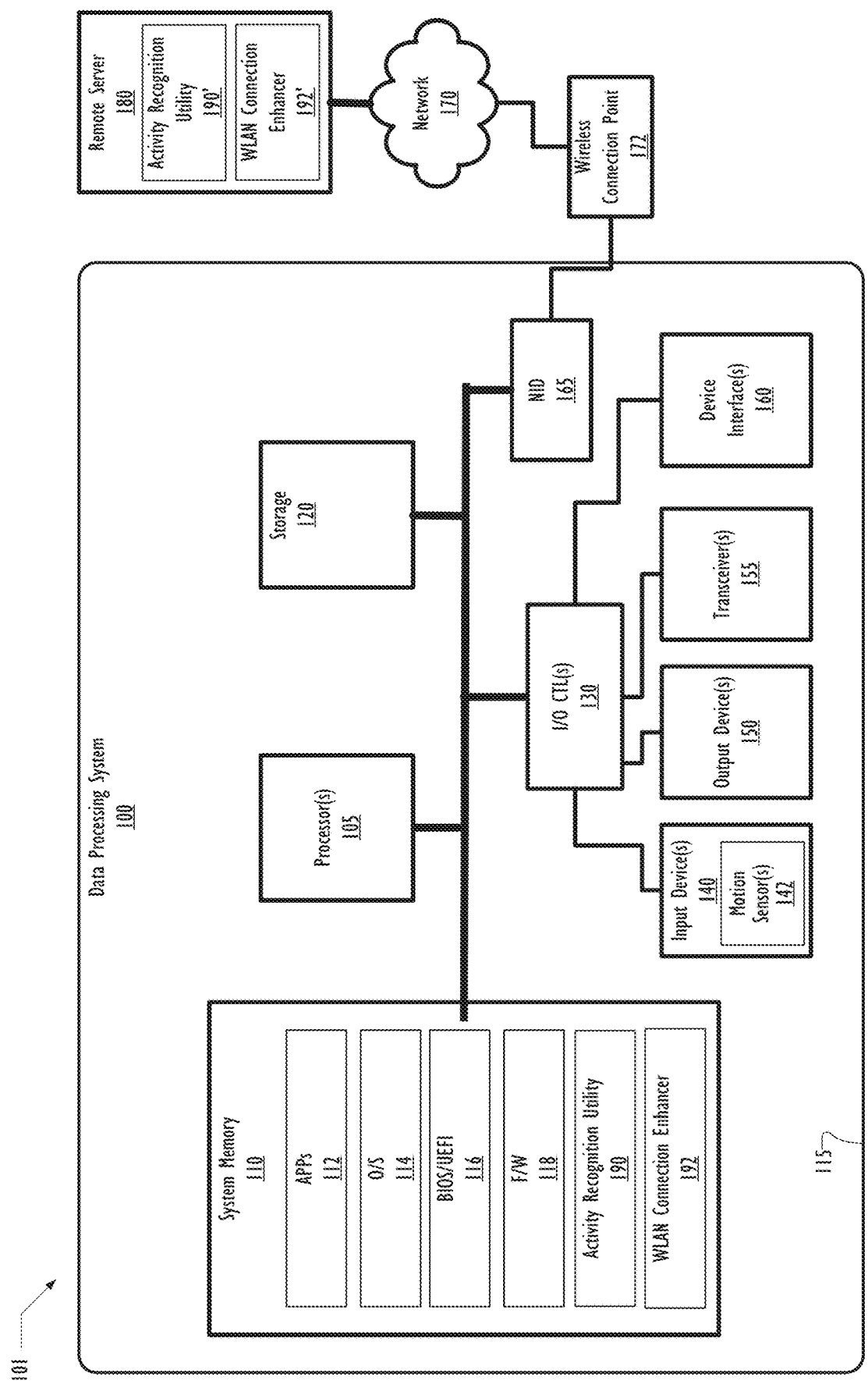
FIG. 1 is a block diagram representation of an example data processing system within which certain aspects of the disclosure can be practiced, in accordance with one or more embodiments of this disclosure.

The illustrative embodiments describe a method, a wireless communication device, and a computer program product for selectively connecting to a wireless local area network (WLAN) based on activity recognition. According to one aspect, a wireless communication device includes at least one wireless communication transceiver and a processor coupled to the transceiver. The processor executes program code that enables the device to: determine, based on input received from the transceiver, whether the wireless communication device is camped within a coverage area of an accessible wireless connection point while the wireless communication device is in motion. In response to determining the wireless communication device is camped within the coverage area of an accessible wireless connection point, the processor selectively connects the transceiver to the accessible wireless connection point. In response to determining the wireless communication device is not camped within the coverage area of an accessible wireless connection point, the processor defers connecting the transceiver to the accessible wireless connection point.

According to another aspect of the disclosure, a method is provided within a wireless communication device. The method includes determining whether the wireless communication device is camped within a coverage area of an accessible wireless connection point, while the wireless communication device is in motion. The method includes, in response to determining the wireless communication device is camped within the coverage area of an accessible wireless connection point while the wireless communication device is in motion, selectively connecting a transceiver of the wireless communication device to the accessible wireless connection point. The method includes, in response to determining the wireless communication device is not camped within the coverage area of an accessible wireless connection point while the wireless communication device is in motion, deferring connecting the transceiver to the accessible wireless connection point.

According to one additional aspect of the disclosure, a computer program product is provided that includes a non-transitory computer readable storage device and program code on the computer readable storage device that when executed by a processor associated with a wireless communication device, the program code enables the wireless communication device to provide specific functionality according to the present disclosure. The computer program product code enables the wireless communication device to determine whether the wireless communication device is camped within a coverage area of an accessible wireless connection point while the wireless communication device is in motion. The computer program product code enables the wireless communication device to selectively connect a transceiver of the wireless communication device to the accessible wireless connection point, in response to determining the wireless communication device is camped within the coverage area of an accessible wireless connection point while the wireless communication device is in motion. The computer program product code enables the wireless communication device to defer connecting the transceiver to the accessible wireless connection point in response to determining the wireless communication device is not camped within the coverage area of an accessible wireless connection point while the wireless communication device is in motion.

In the following description, specific example embodiments in which the disclosure may be practiced are described in sufficient detail to enable those skilled in the art to practice the disclosed embodiments. For example, specific details such as specific method sequences, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "alternate embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within the presented devices are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 illustrates a block diagram representation of a data processing device, specifically data processing system (DPS) 100, within which one or more of the described features of the various embodiments of the disclosure can be implemented. DPS 100 may be a handheld device, personal computer, a server, a network storage device, or any other suitable device, and DPS 100 may vary in size, shape, performance, functionality, and price. DPS 100 operates within communication system 101, within which DPS 100 can communicate with remote server 180 and other external devices via network 170.

Example DPS 100 includes one or more processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data.

As shown, system memory 110 can include therein a plurality of software and/or firmware modules including application(s) 112, operating system (O/S) 114, basic input/output system/unified extensible firmware interface (BIOS/UEFI) 116, and other firmware (F/W) 118. As described more particularly below, system memory 110 includes activity recognition utility 190 and WLAN Connection Enhancer 192. System memory 110 may include additional software modules that perform location and motion detection.

In some embodiments, storage 120 can be a hard drive or a solid-state drive. The one or more software and/or firmware modules within storage 120 can be loaded into system memory 110 during operation of DPS 100. The various software and/or firmware modules have varying functionality when their corresponding program code is executed by processor(s) 105 or other processing devices within DPS 100.

Figure 2:
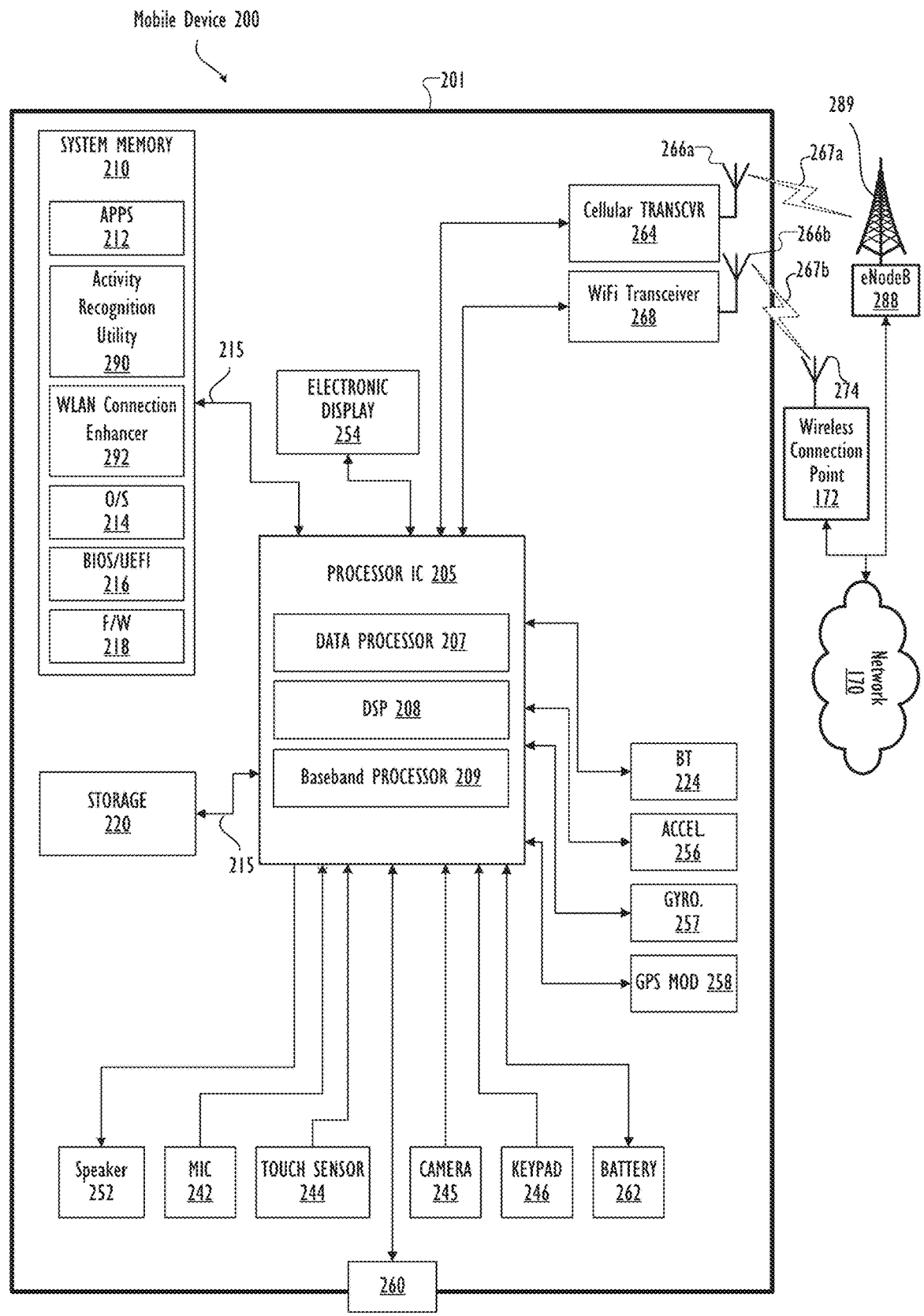
FIG. 2 illustrates a mobile device within which certain aspects of the disclosure can be practiced, in accordance with one or more embodiments of this disclosure.

DPS 100 further includes one or more input/output (I/O) controllers 130, which support connection by, and processing of signals from, one or more connected input device(s) 140, such as a keyboard, mouse, touch screen, sensors, and motion sensor(s) 142. Motion sensor 142 detects movement of DPS 100. FIG. 2 presents several examples of motion sensor 142. As shown, motion sensor may include accelerometer 256 (FIG. 2) capable of detecting three-dimensional acceleration along X, Y, and/or Z axes. Motion sensor 142 may include gyroscope 257 (FIG. 2) capable of measuring angular velocity and global positioning system (GPS) module 258 (FIG. 2). The three-dimensional acceleration along one or more axes, such as X, Y, and/or Z axes, can also be determined by the combination of inputs from gyroscope 257 and GPS module 258. Other examples of motion sensor 142 may include camera 245 (FIG. 2) and/or proximity detector (such as an optical sensor or ultrasonic sensor). I/O controllers 130 also support connection to and forwarding of output signals to one or more connected output devices 150, such as a display or audio speaker(s). I/O controllers 130 also support connection with and processing of signals received at and outputted by one or more connected I/O devices, such as transceiver(s) 155. Transceiver 155 can be a wireless transceiver that receives and transmits wireless signals according to one or more wireless standards or protocols, for example Bluetooth Low Energy or WiFi standard. Additionally, in one or more embodiments, one or more device interface(s) 160, such as an optical reader, a universal serial bus (USB), a card reader, Personal Computer Memory Card International Association (PCMIA) slot, and/or a high-definition multimedia interface (HDMI), can be coupled to I/O controllers 130 or can otherwise be associated with DPS 100. Device interface(s) 160 can be utilized to enable data to be read from or stored to additional devices (not shown) for example a compact disk (CD), digital video disk (DVD), flash drive, or flash memory card. These devices can collectively be referred to as removable storage devices and are examples of non-transitory computer readable storage media. In one or more embodiments, device interface(s) 160 can further include General Purpose I/O interfaces, such as an Inter-Integrated Circuit (I²C) Bus, System Management Bus (SMBus), and peripheral component interconnect (PCI) buses.

DPS 100 further comprises a network interface device (NID) 165. NID 165 enables DPS 100 to communicate and/or interface with other devices, services, and components located external (remote) to DPS 100. For example, NID 165 enables DPS 100 to communicate and/or interface with remote server 180, via a communication network. These devices, services, and components can interface with DPS 100 via an external network, such as example network 170, using one or more communication protocols. Network 170 can be a local area network, wide area network, personal area network, signal communication network, and the like, and the connection to and/or between network 170 and DPS 100 can be wired or wireless or a combination thereof. For simplicity and ease of illustration, network 170 is indicated as a single block instead of a multitude of collective components. However, it is appreciated that network 170 can comprise one or more direct connections to other devices as well as a more complex set of interconnections as can exist within a wide area network, such as the Internet. In at least one embodiment, network 170 includes a wireless connection point 172 that connects DPS 100 to remote server 180 via network 170. In at least one embodiment, wireless connection point 172 is a WiFi access point. In at least one embodiment, wireless connection point 172 is a Bluetooth connection point. For simplicity, this disclosure is described as though wireless connection point 172 is a WiFi access point, but it is understood that wireless connection point 172 can implement Bluetooth standards to communicate with DPS 100 by way of a Bluetooth transceiver (e.g. Bluetooth transceiver 224 of FIG. 2). Remote server 180 includes cloud-based activity recognition utility 190' and cloud-based WLAN Connection Enhancer 192' that each performs similar functions as activity recognition utility 190 and WLAN Connection Enhancer 192, respectively. The specific functionality of each of these components or modules within remote server 180 are described more particularly below.

As introduced above, DPS 100 also includes activity recognition utility 190 and WLAN Connection Enhancer 192. Within this embodiment, processor 105 executes activity recognition utility 190 and WLAN Connection Enhancer 192 to provide the various methods and functions described herein. For simplicity, activity recognition utility 190 and WLAN Connection Enhancer 192 are each illustrated and described as a stand-alone or separate software/firmware/logic component, which provides the specific functions and methods described herein. However, in at least one embodiment, activity recognition utility 190 or WLAN Connection Enhancer 192 may be a component of, may be combined with, or may be incorporated within OS 114, and/or with one or more applications 112. In at least one embodiment, activity recognition utility 190 or WLAN Connection Enhancer 192 may be implemented by and/or integrated into a system-on-a-chip, an application specific integrated circuit (ASIC), or other type of hardware component which can stand alone from DPS 100 or remote server 180. According to one aspect of the disclosure, activity recognition utility 190 analyzes signals received from one or more motion sensor(s) 142 to determine a context of DPS 100. Examples of context of DPS 100, include activities of a user carrying DPS 100 while the user drives, walks, runs, stair-climbs, bikes, works, or plays. Activity recognition utility 190 automatically detects activities by periodically reading short bursts of sensor data (e.g., motion sensor data from motion sensor(s) 142) and processing the sensor data using machine learning models. Activity recognition utility 190 combines motion sensor data from accelerometer 256 and gyroscope 257 (FIG. 2) to determine which axis(es), among the axes (such as X, Y, and/or Z axes) that pass through DPS 100, corresponds to the direction of motion of DPS 100. More particularly, activity recognition utility 190 analyzes the signals received from one or more motion sensor(s) 142 to calculate a confidence value from 0 to 100 indicating how likely it is that the user is performing a particular type of activity. The larger the confidence value, the more consistent the motion sensor data is with the detected type of activity. Larger confidence values (e.g., >50) indicate more likely than not that the detected activity is correct, while a confidence value of 50 or less indicates that there may be another activity that is just as, or more likely. An analysis result outputted by activity recognition utility 190 may, at times, show that multiple activities have high confidence values. For example, activity recognition utility 190 may determine that on-foot activity has a confidence of 100 while a running activity may have a confidence of 95. The sum of the confidences of all detected activities for a classification does not have to be at most (≤) 100 because some activities are not mutually exclusive. For example, a user can be walking while in a bus (or other vehicle). Also, some activities are hierarchical (e.g., on-foot is a generalization of walking and running). In response to recognizing the activities of the user, activity recognition utility 190 generates and outputs a motion activity event (such as device state 304 of FIG. 3) as an indicator indicating motion of DPS 100 relative to WLAN Connection Enhancer 192.

In at least one embodiment, activity recognition utility 190 generates a motion activity event (such as device state 304 of FIG. 3) based on activity transitional conditions (namely, enter, exit). For example, in at least one embodiment, WLAN Connection Enhancer 192 can provide a no-cellular-data experience to the user of DPS 100 during times the user is a driver/passenger in a vehicle. WLAN Connection Enhancer 192 will receive a motion activity event (such as in-vehicle state 304a of FIG. 3) when a user has entered a vehicle or exited a vehicle, but not when the user is being still (e.g., Still state 304b of FIG. 3) at a red traffic signal, or during any other transient activities of the user while the user is in the vehicle. That is, activity recognition utility 290 performs activity recognition filtering between the activity transitional conditions of interest (e.g., enter and exit in-vehicle state 304a).

WLAN Connection Enhancer 192 implements a process (such as process 700 of FIG. 7) to selectively connect to a wireless local area network (WLAN) based on activity that is recognized by activity recognition utility 190, in accordance with one or more embodiments of this disclosure. In order to offload data communications from cellular networks and to reduce cellular data service charges, WLAN Connection Enhancer 192 enables DPS 100 to connect to a WiFi network that is relatively stationary relative to the location of DPS 100, even while DPS 100 (moving together with the body of the user) is in motion. Additional aspects of activity recognition utility 190 and WLAN Connection Enhancer 192, and functionality thereof, are presented within the description of FIGS. 2-7.

In the description of the following figures, reference is also occasionally made to specific components illustrated within the preceding figures, utilizing the same reference numbers from the earlier figures. With reference now to FIG. 2, there is illustrated example mobile device 200. Mobile device 200 includes at least one processor integrated circuit (IC), processor IC 205. Included within processor IC 205 are data processor 207 and digital signal processor (DSP) 208. In some embodiments, processor IC 205 includes a baseband processor 209. In some embodiments, baseband processor 209 is an additional integrated circuit processor that is not included within processor IC 205. Processor IC 205 is coupled to system memory 210 and non-volatile storage 220 via a system interconnect 215. System interconnect 215 can be interchangeably referred to as a system bus, in one or more embodiments.

System memory 210 may be a combination of volatile and non-volatile memory, such as random access memory (RAM) and read-only memory (ROM). One or more software and/or firmware modules can be loaded into system memory 210 during operation of mobile device 200. As shown, system memory 210 can include therein a plurality of software and/or firmware modules including application(s) 212, operating system (O/S) 214, basic input/output system/unified extensible firmware interface (BIOS/UEFI) 216, and other firmware (F/W) 218. The various software and/or firmware modules have varying functionality when their corresponding program code is executed by processor IC 205 or other processing devices within mobile device 200.

In some embodiments, storage 220 can be a hard drive or a solid-state drive. The one or more software and/or firmware modules within storage 220 can be loaded into system memory 210 during operation of mobile device 200.

Processor IC 205 supports connection by and processing of signals from one or more connected input devices such as microphone 242, touch sensor 244, camera 245, and keypad 246. In at least one embodiment, touch sensor 244 is a component of electronic display 254, enabling mobile device 200 to receive user tactile/touch input. Together, electronic display 254 and touch sensor 244 form a touchscreen electronic display that allows a user to provide input into mobile device 200 by touching features displayed on a display screen.

Processor IC 205 also supports connection by and processing of signals to one or more connected output devices, such as speaker 252 and electronic display 254. In at least one embodiment, mobile device 200 includes multiple electronic displays 254. Electronic display 254 can be one of a wide variety of display devices, such as a liquid crystal display (LCD) or an organic light emitting diode (OLED) display.

Additionally, in one or more embodiments, one or more device interfaces 260, such as an optical reader, a universal serial bus (USB), a card reader, Personal Computer Memory Card International Association (PCMIA) slot, and/or a high-definition multimedia interface (HDMI), can be associated with mobile device 200. Mobile device 200 also contains a power source, such as battery 262, that supplies power to mobile device 200.

Mobile device 200 further includes Bluetooth transceiver (BT) 224, accelerometer (ACCEL.) 256, global positioning system module (GPS MOD) 258, and gyroscope 257, all of which are communicatively coupled to processor IC 205. Bluetooth transceiver 224 enables mobile device 200 and/or components within mobile device 200 to communicate and/or interface with other devices, services, and components that are located external to mobile device 200 via Bluetooth communication protocol. In at least one embodiment, Bluetooth transceiver 224 communicates using the same antenna 266b that is used by WiFi transceiver 268. Accelerometer 256 is utilized to measure non-gravitational acceleration and enables processor IC 205 to determine velocity and other measurements associated with the quantifiable physical movement of a user. Gyroscope 257 communicates the angular position of mobile device 200 using gravity to help determine orientation. GPS MOD 258 enables mobile device 200 to communicate and/or interface with other devices, services, and components to send and/or receive geographic position information.

Mobile device 200 is presented as a wireless communication device. As a wireless device, mobile device 200 can transmit data over wireless network 170. Mobile device 200 includes at least one transceiver, including cellular transceiver 264 and WiFi transceiver 268. Each transceiver 264, 268 is communicatively coupled to processor IC 205 and to a respective one of antennas 266a, 266b (generally, antenna 266). Cellular transceiver 264 allows for wide-area communication, via wireless signal 267a, between mobile device 200 and evolved node B (eNodeB) 288, which includes antenna 289. WiFi transceiver 268 allows for local wireless communication, via a wireless signal 267b, between mobile device 200 and a wireless connection point 172, which includes antenna 274. Mobile device 200 is capable of wide-area or local wireless communication with other mobile wireless devices or with eNodeB 288 as a part of a wireless communication network. In one example, mobile device 200 communicates with other mobile wireless devices by utilizing a communication path involving cellular transceiver 264, antenna 266a, wireless signal 267a, antenna 289, and eNodeB 288. In another example, mobile device 200 communicates with other mobile wireless devices by utilizing a communication path involving WiFi transceiver 268, antenna 266b, wireless signal 267b, antenna 274, and wireless connection point 172. In one embodiment, other devices within mobile device 200 utilize antenna 266 to send and/or receive signals in the form of radio waves. For example, GPS module 258 can be communicatively couple to antenna 266 to send/and receive location data.

As provided by FIG. 2, mobile device 200 additionally includes activity recognition utility 290 and WLAN Connection Enhancer 292, which may be provided as an application that is optionally located within the system memory 210 and executed by processor IC 205. Within this embodiment, processor IC 205 executes activity recognition utility 290 and WLAN Connection Enhancer 292 to provide the various methods and functions described herein. In order to recognize activity (e.g., driving, walking, running, stair-climbing, biking, working, or playing) associated with mobile device 200, activity recognition utility 290 collects and analyzes signals received from one or more motion sensor(s) 142 (FIG. 1), 256, 257 to determine a context of mobile device 200. In response to recognizing the activities of the user, activity recognition utility 290 generates and outputs a motion activity event (such as device state 304 of FIG. 3) as an indicator indicating motion of mobile device 200 to WLAN Connection Enhancer 292. In order to provide enhanced WLAN connection, WLAN Connection Enhancer 292 enables mobile device 200 to perform a process (such as process 700 of FIG. 7) to selectively connect to a wireless local area network (WLAN) based on activity that is recognized by activity recognition utility 290, in accordance with one or more embodiments of this disclosure. In at least one embodiment, activity recognition utility 290 may be a component of, may be combined with, or may be incorporated within one or more applications 212. In at least one embodiment, WLAN Connection Enhancer 292 may be a component of, may be combined with, or may be incorporated within one or more applications 212. In this disclosure, for simplicity, various methods and functions described in this disclosure are described as though performed by activity recognition utility 290 or performed by WLAN Connection Enhancer 292. However, it is understood that processor IC 205 performs the various methods and functions described in this disclosure by executing activity recognition utility 290 and WLAN Connection Enhancer 292, respectively.

Although two activity recognition utilities 190 of FIG. 1 and 290 of FIG. 2 are shown, and although two WLAN Connection Enhancers 192 of FIG. 1 and 292 of FIG. 2 are shown, it is understood that activity recognition utility 290, and WLAN Connection Enhancer 292 of FIG. 2 can have the same or similar configuration as respective components of FIG. 1, and can perform the same or similar operations or functions as activity recognition utility 190 and WLAN Connection Enhancer 192 of FIG. 1. Similarly, DPS 100 of FIG. 1 could include components of a mobile device, as shown in FIG. 2.

Figure 3:
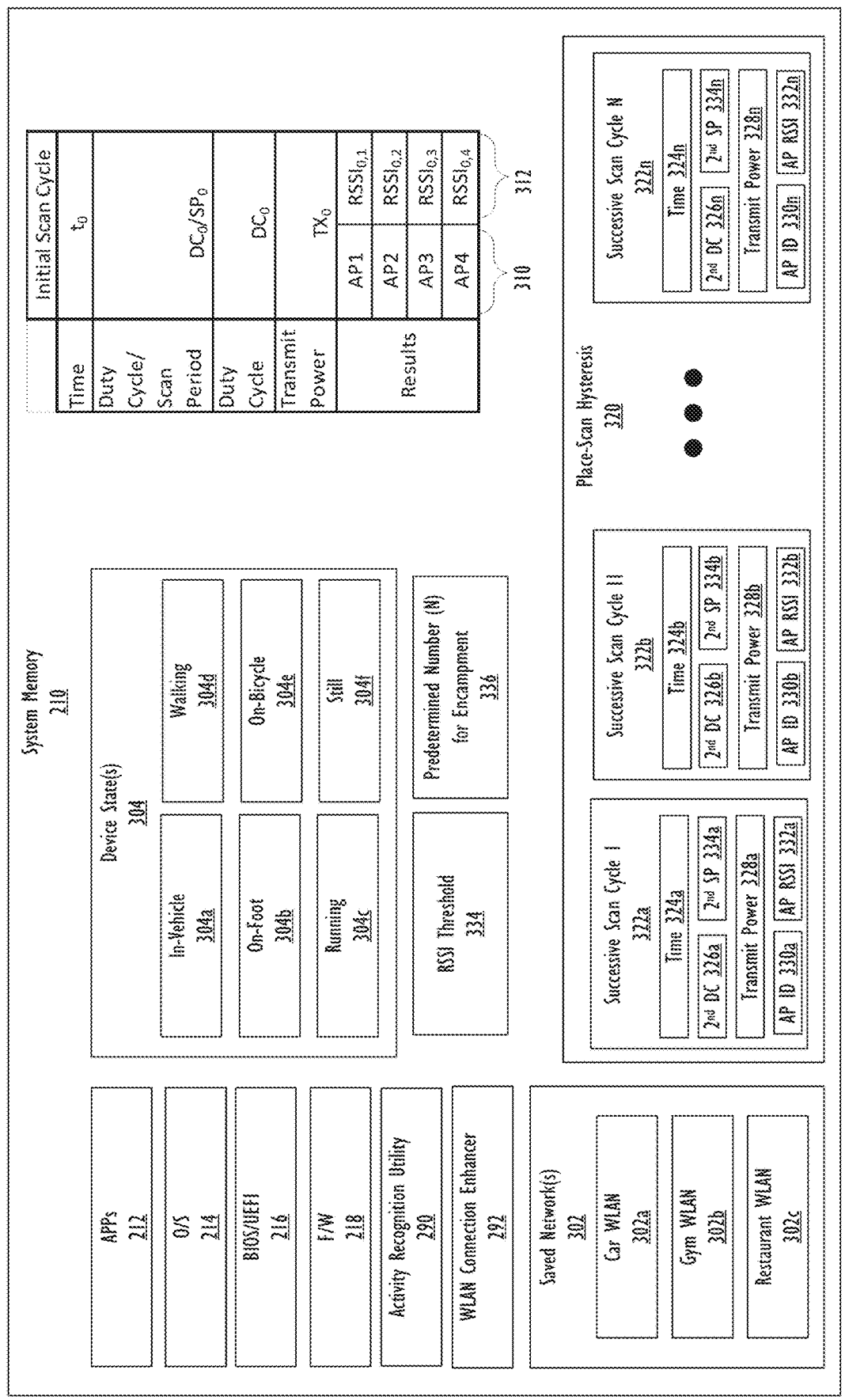
FIG. 3 is a block diagram presenting example contents of the system memory of the data processing system and which enables enhanced wireless local area network (WLAN) connection based on activity recognition, according to one or more embodiments.

With reference now to FIG. 3, there is illustrated a block diagram of example contents of the system memory 210 of example mobile device 200 and which enables enhanced WLAN connection based on activity recognition, according to one or more embodiments. System memory 210 includes data, software, and/or firmware modules, including applications 212, operating system 214, BIOS/UEFI 216, firmware 218, activity recognition utility 290, and WLAN Connection Enhancer 292. Execution of WLAN Connection Enhancer 292 by processor IC 205 enables/configures mobile device 200 to perform the processes presented in the flowchart of FIG. 7, as will be described below. It is understood that system memory 110 of FIG. 1 can have the same or similar components and can perform the same or similar operations or functions as system memory 210 of FIG. 3. For example, system memory 110 of FIG. 1 could include components shown in FIG. 3. For simplicity, details about system memory 210 of mobile device 200 are provided in this disclosure, but to avoid duplication, similar details for system memory 110 of DPS 100 (FIG. 1) are not described.

Vendors of certain services typically offer free Internet access to customers via WiFi. As examples, a fast-food restaurant chain may offer WiFi at its restaurants, a fiber-optics Internet service provider (ISP) can offer millions of WiFi hotspots for subscribers, and a cellular communications company can offer WiFi hotspots for subscribers. That is, some WiFi coverage areas encompass restaurants, fitness facilities, retail stores, and in the case of very powerful WiFi connection points 172, encompass sidewalks, roads, or highways. These vendor-provided WiFi connection points 172 are often configured with open security, with or without a captive portal login. If mobile device 200 connects to such an open WiFi network, mobile device 200 will save the network configuration of that WiFi network in saved network(s) 302 and treat that WiFi network as a saved/known network. The next time the user carries mobile device 200 while passing through the coverage area of that saved network, mobile device 200 will detect and attempt an automatic connection to that network. As an example, a user of mobile device 200 may frequently drive a vehicle (see FIG. 4) that provides a WiFi hotspot. The user may also regularly exercise at a fitness facility that is within the coverage area of a vendor-provided WiFi network, and the user may often dine in at a restaurant that provides a WiFi hotspot. Saved network(s) 302 of mobile device 200 may store a network configuration of car WLAN 302a, fitness facility WLAN 302b (shown as "Gym WLAN"), and restaurant WLAN 302c, respectively.

In many scenarios, while the user is on-the-go (e.g., walking to train station, running a path, or bicycling along streets), the user actively listens to music, browses the internet, communicates on voice/video calls routed over WiFi, e.g., network 170 (including the Internet), or uses mobile device 200 for one or more different various kinds of online activity. At the same time, if mobile device 200 attempts to automatically connect with saved networks 302, then mobile device 200 will not have reliable Internet access and will have poor user experience. The reason is that in such on-the-go scenarios, in which mobile device 200 quickly enters and exits the coverage area of a wireless connection point 172 associated with a saved network 302, network conditions change too rapidly. More particularly, while on-the-go, mobile device 200 does not remain in the coverage area of a single WiFi network long enough to (i) scan for saved networks 302, (ii) connect to a detected network, and (iii) download a sufficient buffer of streaming media or data to avoid interruptions in streaming media playback or in Internet data transfer or choppiness of voice signals of a WiFi call. Interruptions in streaming media playback/Internet data transfer and poor-quality voice signals result in poor user experience as the network conditions change too rapidly.

According to conventional methods, a mobile device is configured with a setting that prevents/defers/avoids attempts to automatically connect to saved networks while the context of the mobile device indicates that the detected movement of the device is a result of the user exercising or traveling. The user of a mobile device that operates according to this conventional setting will be prevented from accessing (e.g., deprived of) vendor-provided WiFi hotspots while doing everyday activities, such as walking within a retail store, exercising within a fitness facility, or traveling within a vehicle that provides a WiFi hotspot (e.g., moving cruise vessel). However, actually the user is relatively at the same place, and the WiFi network conditions will be relatively stable for the device to be able to access the Internet reliably. With the device setting preventing connection to vendor-provided WiFi hotspots, the mobile device uses a cellular network for data communications. If WiFi hotspot deprivation occurs in a region where cellular data coverage is not good, then reliability of the cellular data connection will be poor. Also, if cellular signals are weak, then data communication via the mobile device may experience lots of buffering or connection problems.

According to one aspect of this disclosure and as presented via the various embodiments described herein, mobile device 200 provides better WiFi internet access user experience by detecting whether current user activity (i.e., context of mobile device 200) is confined within a WiFi coverage area (e.g., at a restaurant/retail store/gym or within a bus/passenger train/airplane) or is actually on-the-go without stable WiFi coverage. More particularly, activity recognition utility 290 enables mobile device 200 to detect and recognize user activity, and WLAN Connection Enhancer 292 enables mobile device 200 to implement a process (such as process 700 of FIG. 7) to selectively connect to a WLAN based on that activity recognition. Upon detecting the activity of the user and context of mobile device 200, and WLAN Connection Enhancer 292 determines either to allow or avoid connection to wireless connection point 172 based on a device state(s) 304.

Activity recognition utility 290 determines a device state 304 using sensor data, mobile services applications, or contextual information. For example, activity recognition utility 290 may determine that the device state(s) 304 is one of the following states: in-vehicle state 304$a$, on-foot state 304$b$, running state 304$c$, walking state 304$d$, on-bicycle state 304$e$, and still state 304$f$. In at least one embodiment, activity recognition utility 290 may determine that the device state(s) 304 is a combination of states, such as the combination of states 304$a$ and 304$d$ associated with walking within a moving vehicle. In another example, walking is a sub-activity of on-foot activity. In this example, activity recognition utility 290 may determine that the device state(s) 304 is a combination of states 304$b$ and 304$d$ associated with walking on-foot. With these examples, the device state correlates or corresponds to the activity (and associated movement) of the user of the device. When mobile device 200 is in motion, WLAN Connection Enhancer 292 may determine that the device state(s) 304 is in-vehicle state 304$a$, running state 304$c$, walking state 304$d$, or on-bicycle state 304$e$. WLAN Connection Enhancer 292 obtains the device state(s) 304 from activity recognition utility 290.

WLAN Connection Enhancer 292 enables mobile device 200 to iteratively perform an initial scan cycle to detect (i.e., discover) a first set of wireless connection points accessible to WiFi transceiver 268 of mobile device 200. System memory 210 stores the scan results 308 from the initial scan cycle. As provided, scan results 308 from the initial scan cycle include a time (to) of the start of the initial scan, the current duty cycle and corresponding scanning period, the transmit power level ($TX_0$), an identification 310 of and an RSSI 312 associated with each of the first set of wireless connection points accessible to the WiFi transceiver 268. The current duty cycle of the initial scan is referred to as initial duty cycle ($DC_0$). The transmit power level of the initial scan is a value between a maximum transmit power level (100%) and minimum transmit power level (0%). The maximum transmit power level enables WLAN Connection Enhancer 292 to detect wireless connection points 172 that have a weaker RSSI or are located a farther distance away. In comparison, a transmit power level reduced below the maximum transmit power level enables WLAN Connection Enhancer 292 to detect wireless connection points 172 that have a stronger RSSI or are located a closer distance away. As an example, WLAN Connection Enhancer 292 can adjust/reduce the transmit power level in order to avoid detecting wireless connection points 172 that have a weak RSSI that is not in an acceptable range compared to RSSI Threshold 334. Reducing the transmit power level 328 can be used to effectively filter out the wireless connection points 172 that have an unacceptably weak RSSI. WLAN Connection Enhancer 292 can adjust the transmit power level 328 using various methods, including statically by one fixed amount, linearly by a series of equal amounts, or exponentially by a series of exponentially-proportional amounts. Adjusting the transmit power level linearly or exponentially could lead to multiple transmissions at non-optimal power levels, non-optimal scan results that show detection of too many or too few WiFI APs, or drainage of battery 262. In embodiments of adjusting statically, WLAN Connection Enhancer 292 reduces transmit power level 328 from a default transmit power value (e.g., 100%) to a fixed, power-saving transmit power value (e.g., 75%). In at least one embodiment, the power-saving transmit power value enables WiFi transceiver 268 to detect a strong-beacon subset of WiFi APs, which are located a closer distance away and have RSSI values that are within the acceptable range (as described below in reference to RSSI Threshold 334 of FIG. 3). The power-saving transmit power value can be determined during configuring/testing for optimization of mobile device 200. In at least one embodiment, WLAN Connection Enhancer 292 adjusts transmit power level 328 from/to default transmit power value (e.g., 100%) to/from a fixed, power-saving transmit power value, in response to the same condition(s) (e.g., defined below as first and second condition(s), or detecting in-vehicle state 304$a$) as used to adjust second duty cycle 326. Reducing the transmit power level 328 can be performed for mobile device 200 to consume less energy from battery 262. When WLAN Connection Enhancer 292 has adjusted/reduced both second duty cycle 326 and transmit power level 328 to respective power-saving values, mobile device 200 consumes less energy from battery 262 than when only one parameter 326, 328 is reduced.

WLAN Connection Enhancer 292 enables mobile device 200 to iteratively perform a successive scan cycle to detect (e.g., discover) a successive set of wireless connection points accessible to the WiFi transceiver 268 of mobile device 200. Similar to the scan results 308 from the initial scan cycle, WLAN Connection Enhancer 292 generates and stores a place-scan hysteresis 320 in system memory 210. Place-scan hysteresis 320 stores at least a predetermined number 336 (illustrated as Predetermined Number (N) for Encampment) of scan results 322 from the most recent iterations of successive scan cycles. In some embodiments, place-scan hysteresis 320 represents a shift register that stores a limited queue or sliding window of scan results 322, for example, the predetermined number 336 (N) of scan results 322. From a first successive scan cycle, place-scan hysteresis 320 stores first successive scan result 322a (illustrated as Successive Scan Cycle I), which includes a time 324a ($t_1$) of the start of the successive scan, the second duty cycle 326a ($DC_1$), the transmit power level 328a ($TX_1$), an identification (AP ID) 330a of and an RSSI (AP RSSI) 332a associated with each of the successive set of wireless connection points accessible to the WiFi transceiver 268. WLAN Connection Enhancer 292 sequentially adds the most recent successive scan result 322 to place-scan hysteresis 320, for example, in a first-in-first-out buffering pattern. Similarly, from iterations of successive scan cycles, place-scan hysteresis 320 stores second successive scan result 322b (illustrated as Successive Scan Cycle II) through $N^{th}$ successive scan result 322n (illustrated as Successive Scan Cycle N), which each includes a respective time 324b-324n ($t_2$-$t_n$). Place-scan hysteresis 320 also includes second duty cycle 326b-326n, the transmit power level 328b-328n ($TX_2$-$TX_n$), and identification 330b-330n of and RSSI 332b-332n associated with of each of respective successive set of wireless connection points accessible to the WiFi transceiver 268.

System memory 210 stores an RSSI Threshold 334, which is a value that WLAN Connection Enhancer 292 compares to at least some of the actual RSSIs within AP RSSI 332a-332n. RSSI Threshold 334 is used to define an acceptable range of signal strength values. For example, RSSI Threshold 334 can represent a minimum acceptable signal strength value, in which case, the acceptable range is defined as being equal to or greater than RSSI threshold 334 (i.e., $RSSI_{Actual} \geq Threshold$). In another example, RSSI Threshold 334 could represent a maximum unacceptable signal strength value, in which case, the acceptable range is defined as being greater than (but not equal to) RSSI threshold 334 (i.e., $RSSI_{Actual} > Threshold$).

Figure 4:
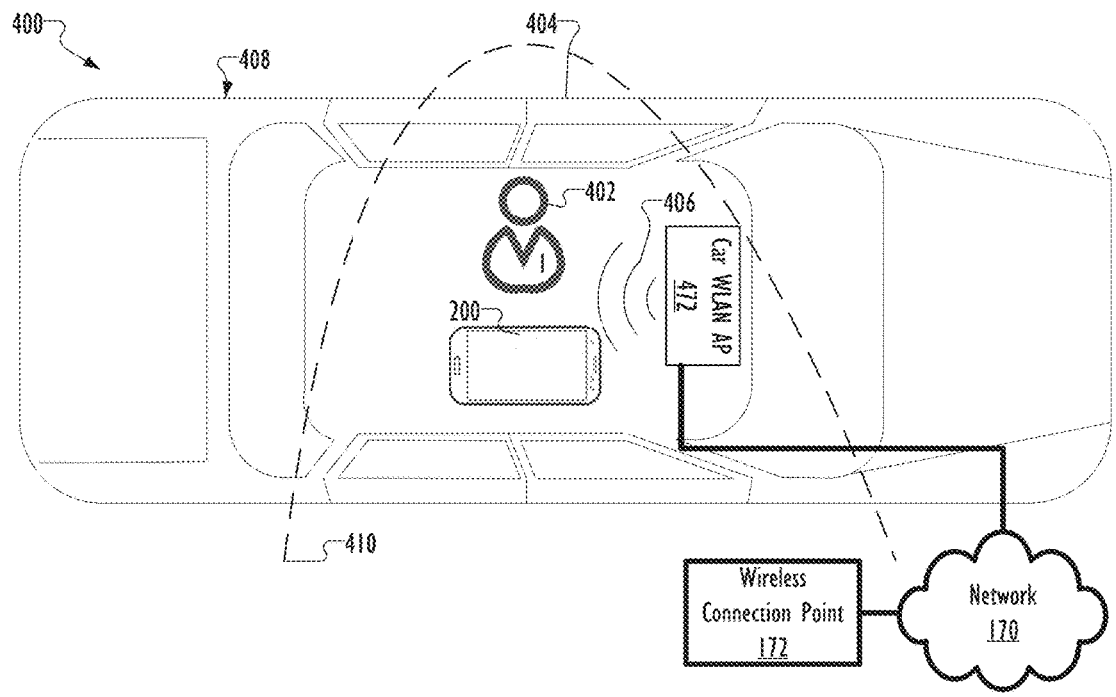
FIG. 4 illustrates an in-transit scenario in which a mobile device selectively connects to a WLAN based on activity recognition, in accordance with one or more embodiments of this disclosure.

With reference now to FIG. 4, there is illustrated an in-transit scenario 400 in which mobile device 200 selectively connects to a WLAN based on activity recognition, in accordance with one or more embodiments of this disclosure. As shown, user 402 has placed mobile device 200 inside vehicle 404. User 402 can be the driver or a passenger of vehicle 404. Vehicle 404 is illustrated as a car, but it is understood that vehicle 404 could represent a truck, bus, motorcycle, or other type of automobile.

Vehicle 404 includes a car WLAN access point 472, which can be the same as or similar to wireless connection point 172 of FIG. 1. Car WLAN access point 472 provides a wireless network to which mobile devices inside coverage area 408 (i.e., inside or in close proximity of vehicle 404) can connect in order to access the Internet. For simplicity, the physical boundary of coverage area 408 is illustrated as being the exterior surface of the body of vehicle 404, but it is understood that coverage area 408 can include areas that are beyond the body, yet in close proximity of vehicle 404. Car WLAN access point 472 transmits a wireless signal 406, which can be a beacon, to be discoverable by mobile devices. Mobile device 200 periodically scans to receive beacons, discover nearby access points, and determine whether to connect to a discovered, saved network 302 (FIG. 3). In at least one embodiment, car WLAN access point 472 pairs with mobile device 200 using Bluetooth near field communication. In at least one embodiment, car WLAN access point 472 connects with mobile device 200 using WiFi communication.

Within in-transit scenario 400, the network of car WLAN access point 472 is car WLAN 302a (FIG. 3) among the saved networks 302. That is, mobile device 200 has previously received user input (e.g., password, pairing key, or other credentials) from user 402 that registers, authenticates, or otherwise permits mobile device 200 to access network 170 via car WLAN access point 472. Within saved network 302, mobile device 200 saves the user input together with network configuration information associated with the connection between car WLAN access point 472 and mobile device 200.

In-transit scenario 400 shows that vehicle 404 is traveling along a road. Activity recognition utility 290 determines that mobile device 200 is in the in-vehicle state 304a based on received contextual information, such as motion sensor data or data indicating that device interface 260 (FIG. 2) is connected to an infotainment system interface of vehicle 404. As vehicle 404 passes by restaurants, retail stores, and other businesses that have vendor-provided WiFi hotspots, mobile device 200 quickly enters and exits the coverage area(s) 410 of vendor-provided WiFi hotspot(s). When WLAN Connection Enhancer 292 performs a scan to detect nearby wireless connection points 172, the scan results will include detection of car WLAN access point 472, and additionally may include detection of one or more wireless connection points 172 that is vendor-provided, if the scan is performed while mobile device 200 is within coverage area 410. For example, if while traveling along the road, WLAN Connection Enhancer 292 performs a scan while vehicle 404 is within coverage area(s) 410 of a McDonald's® vendor-provided WiFi hotspot, then WLAN Connection Enhancer 292 enables mobile device 200 to implement a process (such as process 700 of FIG. 7) to selectively connect to a WLAN based on activity that is recognized by activity recognition utility 290.

In implementing the process (700) according to embodiments of this disclosure, WLAN Connection Enhancer 292 determines whether mobile device 200 is camped within a coverage area 408, 410 of a respective accessible wireless connection point 472, 172 while mobile device 200 is in motion. The term "camped" or "encamped" refers to temporarily occupying space for a period of time that is longer than time to merely pass through without stopping. For example, within in-transit scenario 400, mobile device 200 is camped within a coverage area 408 of car WLAN access point 472. In order to travel inside vehicle 404 along a road, user 402 (together with mobile device 200) does not "enter" and "exit" coverage area 408 of car WLAN access point 472, without stopping inside coverage area 408. Rather, while user 402 (together with mobile device 200) is traveling by way of vehicle 404, user 402 effectively stops inside the coverage area 408 of car WLAN access point 472. At the same time, mobile device 200 (being together with user 402) occupies space inside the coverage area 408 of car WLAN access point 472 for a period of time that is longer than time to merely pass through the coverage area 408 without stopping. Within in-transit scenario 400, WLAN Connection Enhancer 292 determines that mobile device 200 is camped within coverage area 408 of car WLAN access point 472 while mobile device 200 is in motion, traveling by way of vehicle 404.

In implementing the process (700), in response to determining mobile device 200 is camped within the coverage area 408, 410 of a respective accessible wireless connection point 472, 172, WLAN Connection Enhancer 292 selectively connects a transceiver 268 to the accessible wireless connection point 472, 172. Particularly, within in-transit scenario 400, in response to determining mobile device 200 is camped within the coverage area 408 of car WLAN access point 472, WLAN Connection Enhancer 292 selectively connects transceiver 268 to car WLAN access point 472. By connecting transceiver 268 to car WLAN access point 472, WLAN Connection Enhancer 292 not only enables mobile device 200 to offload data communications from cellular networks, but also enables user 402 of mobile device 200 to conduct voice calls (e.g., WiFi calls) over the WiFi network that is provided by car WLAN access point 472, which additionally offloads voice communications from cellular networks.

Additionally, if WLAN Connection Enhancer 292 performs a scan while the user (with mobile device) is traveling along the road and while vehicle 404 is within the coverage area(s) 410 of a McDonald's® vendor-provided WiFi hotspot, then WLAN Connection Enhancer 292 enables mobile device 200 to avoid using saved network configuration of restaurant WLAN 302c and to avoid/defer connection to the McDonald's® vendor-provided wireless connection point. As described above, within in-transit scenario 400, as vehicle 404 passes by restaurants, retail stores, and other businesses that have vendor-provided WiFi hotspots, mobile device 200 quickly enters and exits the coverage area(s) 410 of vendor-provided WiFi hotspot(s) without stopping. Within in-transit scenario 400, WLAN Connection Enhancer 292 determines that mobile device 200 is not encamped within the coverage area(s) 410 of vendor-provided WiFi hotspot(s). In implementing the process (700), in response to determining mobile device 200 is not camped within the coverage area 408, 410 of a respective accessible wireless connection point 472, 172, WLAN Connection Enhancer 292 avoids/defers connecting the transceiver 268 to the accessible wireless connection point 472, 172.

Figure 5:
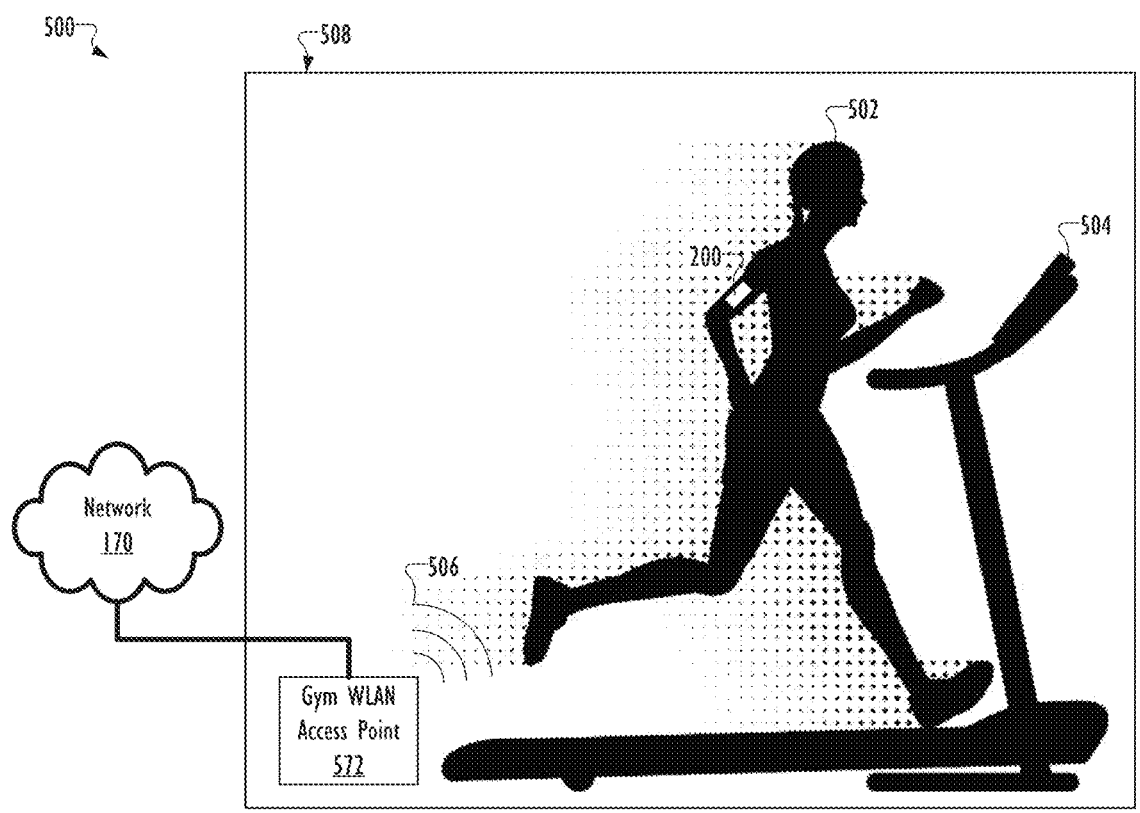
FIG. 5 illustrates a fitness facility scenario in which a mobile device selectively connects to a WLAN based on activity recognition, in accordance with one or more embodiments of this disclosure.

With reference now to FIG. 5, there is illustrated a fitness facility scenario 500 in which a mobile device 200 selectively connects to a wireless local area network (WLAN) based on activity recognition, in accordance with one or more embodiments of this disclosure. As shown, user 502 has attached mobile device 200 to her body while running on a treadmill 504 inside a fitness facility. Inside the fitness facility, a wireless connection point 572 (shown as Gym WLAN Access Point) transmits a wireless signal 506, which can be a beacon, to enable discovery of wireless connection point 572 by mobile devices inside coverage area 508. For simplicity, coverage area 408 is illustrated as being the exterior walls of a gymnasium type fitness facility. It is understood that the fitness facility could be an indoor track facility, an outdoor running path at a park, a stadium, another type of fitness facility, or other three-dimensional space within coverage area 408 of wireless connection point 572 (shown as Gym WLAN Access Point). Wireless connection point 572 represents a WiFi access point that enables customers inside the fitness facility to access network 170 using the vendor-provided WiFi network of the fitness facility.

Fitness facility scenario 500 shows that user 502 is running, which involves bouncing up and down. Also, mobile device 200 is strapped to the arm of user 502, which swings back and forth while user 502 runs. Activity recognition utility 290 determines that mobile device 200 is in the running state 304c based on received contextual information. According to one embodiment, the received contextual information includes motion sensor data or data from a wearable device, which indicates that user 502 is running.

In implementing the process (700) according to embodiments of this disclosure, WLAN Connection Enhancer 292 obtains the device state(s) 304 from activity recognition utility 290, indicating that mobile device 200 is in motion, and specifically in running state 304c. WLAN Connection Enhancer 292 determines that mobile device 200 is camped within coverage area 508 of wireless connection point 572 (hereinafter referred to as Gym AP) while mobile device 200 is in motion. In order to exercise on equipment inside the fitness facility, user 402 (and by extension mobile device 200) effectively stops inside the coverage area 508 of Gym AP 572 while user 502 is running on the treadmill 506 inside the gym. In other words, mobile device 200 (being together with user 402) occupies space inside the coverage area 508 of Gym AP 572 for a period of time that is longer than time to merely pass through the coverage area 408 without stopping.

Figure 6A:
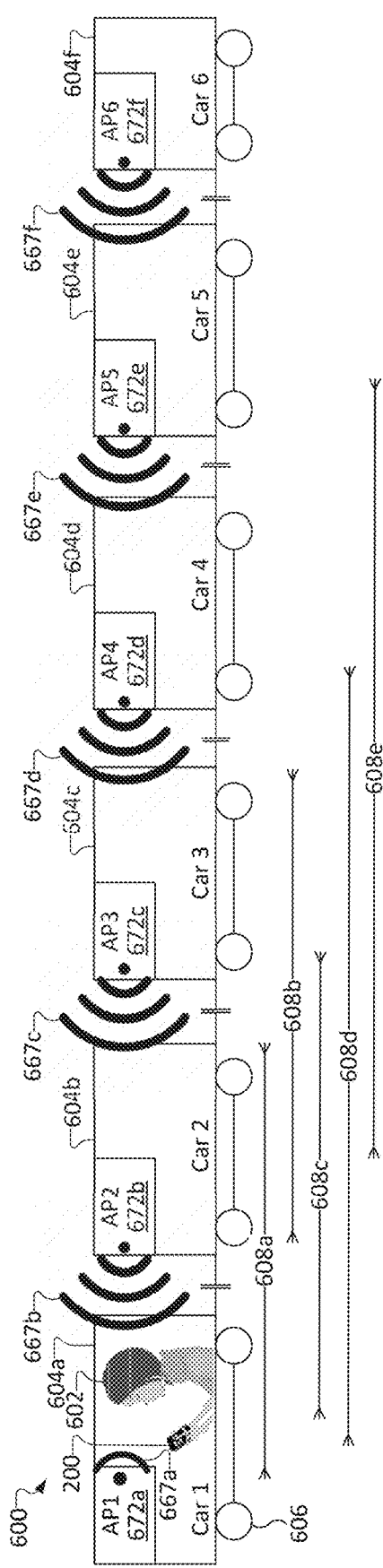
FIGS. 6A and 6B illustrate a passenger train scenario in which a mobile device selectively connects to a WLAN based on activity recognition, in accordance with one or more embodiments of this disclosure.
Figure 6B:
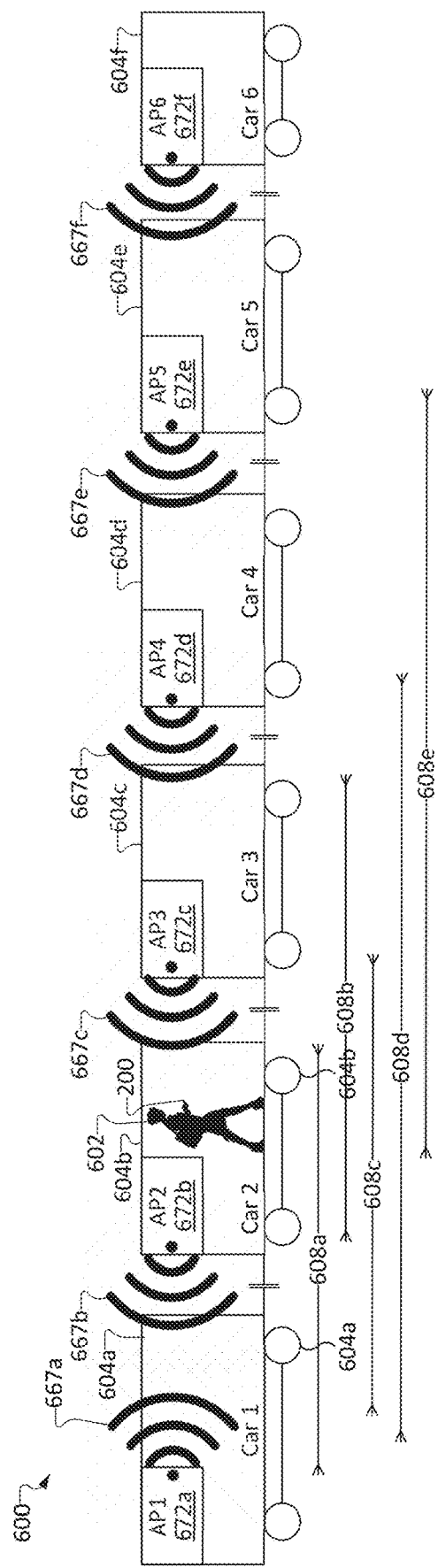

With reference now to FIGS. 6A and 6B, there is illustrated a passenger train scenario 600 in which a mobile device 200 selectively connects to a wireless local area network (WLAN) based on activity recognition, in accordance with one or more embodiments of this disclosure. As shown in FIG. 6A, user 602 is seated inside rail car 604 (specifically, first car 604a (shown as Car 1)) of a passenger train 606 and is holding mobile device 200 in her hands. After riding inside first car 604a for a while, user 602 stands up and walks into the second car 604b of the passenger train 606, as shown in FIG. 6B. In FIG. 6A, WLAN Connection Enhancer 292 enables mobile device 200 to implement a process (such as process 700 of FIG. 7) to selectively connect to a WLAN based on activity that is recognized by activity recognition utility 290, and WLAN Connection Enhancer 292 continues iterations of the process (700) in FIG. 6B.

As shown in FIGS. 6A and 6B, passenger train 606 includes multiple spaces. For example, each car 604 (specifically, first car through sixth car 604a-604f) can represent a respective one of the multiple spaces. Each car 604 includes a respective WiFi access point (AP) 672, which can have the same or similar configuration and can perform the same or similar operations or functions as wireless connection point 272 of FIG. 2 or 172 of FIG. 1. Each WiFi AP 672 creates a WLAN by projecting wireless signals (similar to wireless signal 267b of FIG. 2) within its own coverage area. The coverage area of any particular WiFi AP 672 depends on many factors, such as strength of the transmitter of the AP, height of the AP, and environmental factors, such as ceiling height, nature of physical obstructions, and radio interference surrounding the AP. In passenger train scenario 600, as an example, first WiFi AP 672a, located inside first car 604a, transmits a wireless signal 667a and creates first coverage area 608a that encompasses: the entire space inside of first car 604a, the space between first and second cars 604a-604b, the entire space inside of second car 604b. For ease of illustration, the coverage area 608a of first WiFi AP 672a is illustrated as a single dimensional line, although it is understood to be a three-dimensional space centered about first WiFi AP 672a. For example, coverage area 608a is a 3D spherical space having an origin at first WiFi AP 672a and having a radius extending as far as the illustrated dimension line. Similarly, in passenger train scenario 600, each other WiFi AP 672b-672f, located inside a respective car 604b-604f, transmits a respective wireless signal 667b-667f and creates a respective coverage area 608b-608f of the respective WiFi AP 672b-672f. The coverage area 608b of second WiFi AP 672b encompasses: the entire space inside of second car 604b, the space between second and third cars 604b-604c, the entire space inside of first and third cars 604a and 604c, and the space between first and second cars 604a-604b. The coverage area 608c of third WiFi AP 672c encompasses: the entire space inside of third car 604c, the space between third and fourth cars 604c-604d, the entire space inside of second and fourth cars 604b and 604d, the space between second and third cars 604b-604c, the space between first and second cars 604a-604b, and a partial space at the rear of first car 604a. In passenger train scenario 600, coverage area 608c of third WiFi AP 672c includes the location where mobile device 200 is held by user 602, who is seated inside the partial space at the rear of first car 604a. Different APs can have different types of transmitters that create larger or smaller coverage areas. For example, coverage area 608d of fourth WiFi AP 672d extends farther from fourth WiFi AP 672d than the extension range of the respective coverage area 608a, 608b, 608c of the respective first, second, or third WiFi AP 672a, 672b, or 672c.

The coverage area 608d of fourth WiFi AP 672d encompasses: the entire space inside of fourth car 604d, the entire space inside of fifth and sixth cars 604e and 604f, the space between fourth and fifth cars 604d-604e, the space between fifth and sixth cars 604e-604f, the entire space inside of third and second cars 604c and 604b, the space between third and fourth cars 604c-604d, the space between second and third cars 604b-604c, the space between first and second cars 604a-604b, and the partial space at the rear of first car 604a. The coverage area 608e of fifth WiFi AP 672e has a similar size as the coverage area 608d of fourth WiFi AP 672d. The coverage area 608e of fifth WiFi AP 672d encompasses: the entire space inside of third through sixth cars 604c-604f, a rear half of second car 604b, the space between fourth and fifth cars 604d-604e, the space between fifth and sixth cars 604e-604f, the space between third and fourth cars 604c-604d, and the space between second and third cars 604b-604c. The coverage area 608e of fifth WiFi AP 672e does not encompass any of the space inside first car 604a or the space between first and second cars 604a-604b.

Figure 6C:
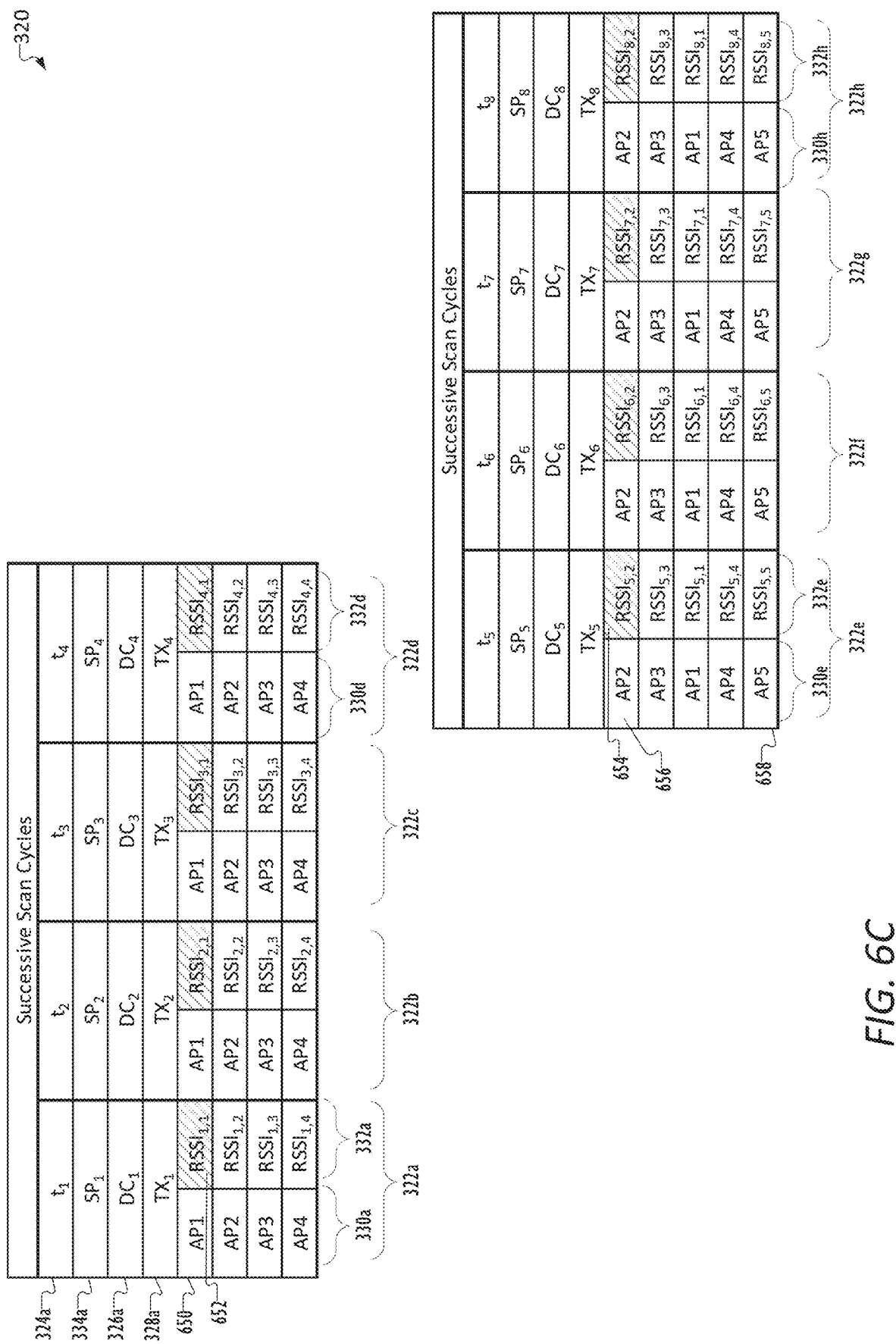
FIG. 6C illustrates a tabular diagram of scan results from consecutive successive scan cycles used to generate a place-scan hysteresis corresponding to the passenger train scenario of FIGS. 6A and 6B, according to one or more embodiments.

FIG. 6C illustrates a tabular diagram of scan results 322a-322h from consecutive successive scan cycles used to generate a place-scan hysteresis 320 corresponding to the passenger train scenario 600 of FIGS. 6A and 6B. Refer now to FIGS. 6A and 6C together. As shown in FIG. 6A, WLAN Connection Enhancer 292 determines whether mobile device 200 is camped within a coverage area of an accessible WiFi AP 672 while mobile device 200 is in motion. More particularly, WLAN Connection Enhancer 292 performs an initial scan cycle to detect a first set of wireless connection points accessible to the mobile device 200. WLAN Connection Enhancer 292 stores the identifications 310 (FIG. 3) of first set of wireless connection points (shown as AP1, AP2, AP3, AP4) as part of scan results 308 (FIG. 3) from the initial scan cycle. As an example, an initial scanning period ($SP_0$), corresponding to initial duty cycle ($DC_0$), could be a length that triggers WLAN Connection Enhancer 292 to repeat a scan cycle like the initial scan cycle every 120 seconds (e.g., $SP_0$=120 seconds).

Activity recognition utility 290 detects movement of mobile device 200. In this scenario, mobile device 200 is inside of first car 604a as passenger train (with first car 604a) travels along railroad tracks. Activity recognition utility 290 generates in-vehicle state 304a as the motion activity event based on motion sensor data that are consistent with riding on a passenger train. WLAN Connection Enhancer 292 detects that a motion activity event, namely, in-vehicle state 304a, has been received from activity recognition utility 290.

In response to detecting that the motion activity event has been received, WLAN Connection Enhancer 292 initiates a successive scan cycle to detect a successive set of WiFi APs 672 accessible to mobile device 200. The start time (e.g., $t_1$) of the successive scan is different from and later than the start time (i.e., $t_0$) of the initial scan, such that the successive scan is not synchronized with the initial scan. In at least one embodiment, the second duty cycle 326a ($DC_1$) of the first successive scan is equal in duration to the initial duty cycle ($DC_0$) of the initial scan. By starting the successive scan a later start time ($t_1$), WLAN Connection Enhancer 292 obtains information to determine which, from among the first set of wireless connection points, is a wireless connections point(s) 172 (regardless of being associated with the train) that is still discoverable and whether the corresponding RSSI is in the acceptable range. WLAN Connection Enhancer 292 stores identifications 330 (FIG. 6C) and RSSIs 332 (FIG. 6C) of the successive set of WiFi APs 672 as part of a scan result 322 (FIG. 6C) of the successive scan cycle. More particularly, in performance of a first successive scan cycle, WLAN Connection Enhancer 292 generates a first scan result 322a (FIG. 6C), which includes start time 324a ($t_1$), second duty cycle 326a ($DC_1$), transmit power level 328a ($TX_1$), and identifications 330a and RSSIs 332a (FIG. 6C) of the successive set of WiFi APs corresponding to the first successive scan cycle. As described below, first scan result 322a further includes an identification 650 of the common WiFi AP having a highest RSSI 652 (highlighted by a hash mark) from among the identifications 330a and RSSIs 332a of the successive set of WiFi APs. In this disclosure, common WiFi AP refers to a "common wireless connection point" that communicates using WiFi standards.

WLAN Connection Enhancer 292 compares the first set of wireless connection points to the successive set of WiFi APs in order to identify one or more common WiFi AP(s), which is a member of both the first set of wireless connection points (i.e., having identifications 310) and the successive set of WiFi APs (i.e., having identifications 330a). In light of the fact that the initial and successive scan cycles are asynchronous, a common WiFi AP indicates that mobile device 200 did not immediately exit the coverage area of the common WiFi AP after the initial scan commenced. Rather, mobile device 200 remained inside the coverage area of the common WiFi AP long enough to be detected by the two asynchronous initial and successive scan cycles. In the first successive scan cycle, WLAN Connection Enhancer 292 identifies WiFi APs 1, 2,3, and 4 as common WiFi APs. As an example only, the first and successive sets of WiFi APs have identical identifications 310 and 330a. It is understood that in other instances, WLAN Connection Enhancer 292 could identify less than all of the first set of wireless connection points as being common WiFi APs, or could identify zero common WiFi APs.

For each common WiFi AP that is identified, WLAN Connection Enhancer 292 also compares the corresponding RSSI (332a) (e.g., $RSSI_{i,j}$) to RSSI threshold 334 (FIG. 3) in order to determine which common WiFi AP is within an acceptable range. In each scan result 322a-322h, the respective common WiFi APs have RSSI values shown as $RSSI_{i,j}$, where the index i represents the iteration of successive scan cycle, and the index j represents the corresponding WiFi AP. In response to determining that an $RSSI_{i,j}$ of the common WiFi AP is within the acceptable range, WLAN Connection Enhancer 292 determines whether place-scan hysteresis 320 includes a predetermined number 336 of scan results 322 from iterations of successive scan cycles. By determining whether place-scan hysteresis 320 includes a predetermined number 336 of scan results 322 from iterations of successive scan cycles, WLAN Connection Enhancer 292 determines whether the sufficient information has been gathered as a prerequisite to making a determination of whether mobile device 200 is or is not camped within the coverage area 608 of a particular WiFi AP 672.

As described above, WLAN Connection Enhancer 292 determines that mobile device 200 is camped within the coverage area 608a of a particular WiFi AP 672a (e.g., AP1) when a redetermined number 336 (e.g., N=4) of scan results 322a-322d that correspond to the most recent iterations of successive scan cycles include that particular WiFi AP as a common WiFi AP. In other words, that particular common WiFi AP 672a is encamped when the identification 650 (FIG. 6C) (illustrated as AP1) of the particular common WiFi AP is within the predetermined number 336 of consecutive scan results 322a-322d. In passenger train scenario 600, after four (4) iterations of successive scan cycles, the predetermined number 336 (e.g., N=4) of scan results 322a-322d show that mobile device 200 is camped within the coverage areas 608a-608d of common WiFi APs 672a-672d (API, AP2, AP3, and AP4).

WLAN Connection Enhancer 292 completes the successive scan cycle within a second scanning period 334 (e.g., $SP_1$). a. The second scanning period is a period of time during which WiFi transceiver 268 completes an ON-and-OFF cycle. Second duty cycle 326 (e.g., $DC_1$) represents the ON portion of the cycle, which is an amount of time that the WiFi transceiver 268 actively scans for beaconing WiFi APs 672. During the ON portion of the cycle, WiFi transceiver 268 transmits a scanning signal (e.g., 267b of FIG. 2) at the level of transmit power 328. The OFF portion is the amount of time that WiFi transceiver 268 is not actively scanning to receive wireless signals 667. All things being equal, a shorter scanning period consumes more power (e.g., battery power) than a longer scanning period, as the shorter scanning period repeats more frequently than the longer scanning period. In general, the duty cycle, as a fraction of the scanning period, has a shorter duration than the corresponding scanning period; however, in rare instances, the duty cycle can be 100% of the scanning period, indicating no OFF portion of the scanning period. WLAN Connection Enhancer 292 determines a value for the second duty cycle 326, and a corresponding value for second scanning period 334, in order to reduce power consumption and to fully detect wireless signals 667 transmitted from WiFi APs 672.

WLAN Enhancer 292 iteratively repeats a successive scan cycle after the period of time of a second scanning period 334 has elapsed. The second scanning period 334 is different from the initial duty cycle DC0. As an example, the scanning period 334 could be a length that triggers WLAN Connection Enhancer 292 to repeat the successive scan cycle every 30 seconds (e.g., $SP_1$=30 seconds). In this example, WLAN Connection Enhancer 292 could perform a predetermined number 336 of (N=4) of iterations of the successive scan cycle, each lasting one second scanning period (e.g., 30-seconds), concurrently while WLAN Connection Enhancer 292 completes one 120-second initial scan cycle. Although the initial and second scanning periods ($SP_0$ and $SP_1$) differ, the corresponding second duty cycle 326 ($DC_1$) could be equal or different in duration than initial duty cycle ($DC_1$).

WLAN Connection Enhancer 292 sets the second duty cycle 326a ($DC_1$) to a default duration value (e.g., 20 seconds) for the first successive scan, which is stored as part of first scan result 322a. That is, second duty cycle 326a ($DC_1$) and the initial duty cycle ($DC_0$), which may be equal in duration, can both be set to the default duration value. As WLAN Connection Enhancer 292 iterates successive scan cycles, the default duration value is maintained for second duty cycles 326b-326n. In at least one embodiment, the default duration value is maintained for iterations of successive scan cycles until WLAN Connection Enhancer 292 determines that a first condition is true. The first condition involves RSSIs 332a-332n of accessible WiFi APs barely fluctuating (e.g., remain substantially constant, or show no significant changes), based on the most recent predetermined number 336 (N) of iterations. RSSIs 332a-332n of accessible WiFi APs barely fluctuate when scan results 322a-322n show that the same set APs (AP1, AP2, AP3, and AP4) are detected (e.g., identifications 330a-330d of FIG. 6) and there are no significant changes in the values of RSSIs 332a-332n. In response to a determination that the first condition is true, WLAN Connection Enhancer 292 can expect (e.g., presume) that accessible WiFi APs (and corresponding RSSIs) will remain substantially constant in the near future (e.g., 10 minutes). WLAN Connection Enhancer 292 can perform scanning less frequently, based on this expectation, thereby enabling mobile device 200 to consume less energy of battery 262.

WLAN Connection Enhancer 292 optionally adjusts the second duty cycle 326 (e.g., $DC_2$) of the next successive scan cycle. More particularly, WLAN Connection Enhancer 292 determines a frequency (herein referred to as "update frequency") at which to update place scan hysteresis 320, and WLAN Connection Enhancer 292 adjusts the second duty cycle 326 to a power-saving duration value, based on the update frequency. The power-saving duration value enables WLAN Connection Enhancer 292 to perform scanning less frequently. By reducing the second duty cycle 326, place scan hysteresis 320 is updated less often. In at least one embodiment, WLAN Connection Enhancer 292 reduces (or further reduces) the second duty cycle 326 when the following two conditions are true concurrently. The first condition is that RSSIs 332a-332n of accessible WiFi APs barely fluctuate (e.g., remain substantially constant). The second condition is that accelerometer 256 outputs motion sensor data that is substantially constant. WLAN Connection Enhancer 292 determines that motion sensor data output by accelerometer 256 is substantially constant when such outputs deviate from each other by less than a specified deviation limit for a specified period of time. For each of the accessible WiFi APs identified (e.g., AP1), WLAN Connection Enhancer 292 uses a similar method to determine that corresponding RSSIs (e.g., $RSSI_{1,1}$, $RSSI_{2,1}$, . . . $RSSI_{N,1}$) barely fluctuate.

In reverse, WLAN Connection Enhancer 292 changes second duty cycle 326 back to the default duration value when outputs from accelerometer 256 and/or RSSIs of each accessible WiFi AP fluctuate a lot. WLAN Connection Enhancer 292 determines that such data (namely, outputs or RSSIs) fluctuate a lot when individual datum deviate from each other by more than a specified deviation threshold for a specified period of time. The specified deviation threshold can be the equal to or different from the specified deviation limit described above. By increasing the second duty cycle 326 from the power-saving duration value to the default duration value, place scan hysteresis 320 is updated more often in order to keep the hysterics data fresher and less prone to error. In at least one embodiment, WLAN Connection Enhancer 292 adjusts the second duty cycle (e.g., $DC_2$) of the next successive scan cycle based on the category of the motion activity event.

In a non-limiting example, activity recognition utility 290 identifies the category of the motion activity event, such as the category of in-vehicle state 304a, as the current device state 304. In this example, WLAN Connection Enhancer 292 maintains second duty cycle 326 ($DC_1$) set at the default duration value until WLAN Connection Enhancer 292 detects that place-scan hysteresis 320 contains the in-vehicle state 304a. In response to determining that the first condition is true and detecting in-vehicle state 304a, WLAN Connection Enhancer 292 reduces second duty cycle 326 to the power-saving duration value for at least the next N iterations. In at least one embodiment, WLAN Connection Enhancer 292 adjusts the second duty cycle 326 in response to determining that place-scan hysteresis 320 contains fewer than the predetermined number 336 (e.g., N=4) of scan results 322, for example, to obtain N scan results 322 more quickly. Adjustments to the second duty cycle 326 are described in detail below with reference to block 720 of FIG. 7. It is understood that mobile device 200 can adjust initial duty cycle DC0 using similar methods as the methods used to adjust a respective second duty cycle 326.

In response to determining mobile device 200 is camped within the coverage area 608 of an accessible WiFi AP 672, WLAN Connection Enhancer 292 selectively connects WiFi transceiver 268 to the accessible WiFi AP 672. More particularly, in response to determining mobile device 200 is camped within coverage area 608 of encamped common WiFi AP(s) 672a-672d, WLAN Connection Enhancer 292 selectively connects WiFi transceiver 268 to one of the encamped common WiFi AP(s) 672a-672d.

In one embodiment, WLAN Connection Enhancer 292 connects WiFi transceiver 268 to a strongest encamped common WiFi AP, which is selected from among the encamped common WiFi AP(s) 672a-672d. WLAN Connection Enhancer 292 identifies a strongest encamped common WiFi AP from among the encamped common WiFi AP(s) 672a-672d. The strongest encamped common WiFi AP is an encamped common WiFi AP that has the highest RSSI in the N scan results. In various embodiments, the highest RSSI in the N scan results corresponds to the WiFi AP 672 having the highest average value of RSSI, or having N consecutive highest values of RSSI. In order to identify which is the strongest encamped common WiFi AP, the highest value RSSI is identified within each of scan result 322 of a successive scan cycle. More particularly, within each of scan result 322 of a successive scan cycle, WLAN Connection Enhancer 292 sorts the AP RSSIs 332 associated with the corresponding successive set of wireless connection points. As an example, in passenger train scenario 600, within the first successive scan result 322a, the AP RSSIs 332a are sorted in descending order, with the highest value RSSI 652 (FIG. 6C) (illustrated as $RSSI_{1,1}$) corresponding to identification 650 (AP1) of WiFi AP 672a. Similarly, in passenger train scenario 600, within the next three (3) successive scan results 322b-322d, the AP RSSIs 332b-332d are sorted in descending order, with the same highest value RSSI (illustrated as $RSSI_{2,1}$, $RSSI_{3,1}$, and $RSSI_{4,1}$) corresponding to the identification 650 (AP1) of WiFi AP 672a. In other words, in passenger train scenario 600, WLAN Connection Enhancer 292 identifies WiFi AP 672a as the strongest encamped common WiFi AP, and in response, connects WiFi transceiver 268 to WiFi AP 672a.

In other scenarios, WLAN Connection Enhancer 292 may determine mobile device 200 is not camped within the coverage area 608 of an accessible WiFi AP 672, and in response would defer connecting WiFi transceiver 268 to the accessible WiFi AP 672. Instead, WLAN Connection Enhancer 292 would enable mobile device 200 to perform cellular communication between cellular transceiver 264 and eNodeB 288.

Refer now to FIGS. 6B and 6C together. As shown in FIGS. 6B, user 602 stands up and walks into the second car 604b of the passenger train 606 while WLAN Connection Enhancer 292 continues the process (700) of iterating another initial scan cycle and concurrently iterating successive scan cycles. Activity recognition utility 290 receives motion sensor data consistent with changes in activity of user 602, and changes the device state 304 from a seated, in-vehicle state 304a to a standing on-foot state 304b state to walking and in-vehicle state 304d and 304a.

In response to generating scan result 322e of fifth successive scan cycle, WLAN Connection Enhancer 292 determines whether place-scan hysteresis 320 exhibits on-the-go activity based on analyzing a sliding window of the predetermined number 336 (N=4) of most recent scan results. There are many indicators that place-scan hysteresis 320 exhibits on-the-go activity. This disclosure does not include an exhaustive list of indicators indicating on-the-go activity, but one example indicator is that a successive set of WiFi APs does not include a common WiFi AP(s). There are many indicators that place-scan hysteresis 320 does not exhibit on-the-go activity, and this disclosure does not include an exhaustive list. But one example indicator indicating that place-scan hysteresis 320 does not exhibit on-the-go activity is that a particular common WiFi AP(s) is identified in a predetermined number 336 of consecutive successive sets of WiFi APs. In response to generating scan result 322e of fifth successive scan cycle, WLAN Connection Enhancer 292 determines that new, different successive set of wireless connection points are accessible based on that additional detection of WiFi AP 672e (AP5). WLAN Connection Enhancer 292 determines that mobile device 200 has moved based on a difference between the identifications 330d of a previous scan result 332d and the identifications 330e of a consecutive, current scan result 332e.

In determining whether place-scan hysteresis 320 exhibits on-the-go activity, WLAN Connection Enhancer 292 analyses the four (N=4) scan results 322b-322e of second through fifth successive scan cycles, comparing identifications 330e and RSSIs 332e of the fifth successive set of WiFi APs with identifications 330d and RSSIs 332d of at least one previous successive set of WiFi APs in order to identify similarities and differences. One example similarity is that WiFi APs 672a-672d (AP1-AP4) are common WiFi AP(s) identified in multiple consecutive successive sets of WiFi APs (e.g., identifications 330a-330e). One example difference is that RSSIs 332e of the fifth successive set of WiFi APs has a highest value RSSI 654 (FIG. 6C) (illustrated as $RSSI_{5,2}$) corresponding to a different WiFi AP 672b (identification 656 (AP2)) than WiFi AP 672a (identification 650 (AP1)). Another example difference is that identifications 330e of the fifth successive set of WiFi APs includes identification 658 of an additional WiFi AP (AP5). Another example difference is that the order of identifications 330e of the fifth successive set of WiFi APs is different than the order of identifications 330d of the fourth successive set of WiFi APs. In passenger train scenario 600, WLAN Connection Enhancer 292 determines that place-scan hysteresis 320 does not exhibit on-the-go activity based on the analysis of similarities and differences between the four (N=4) scan results 322b-322e of successive scan cycles, and then continues iterating successive scan cycles.

Although fourth and fifth scan results 322d-322e are illustrated as being consecutive, it is understood that user 602 can remain seated in first car 604a for longer than four (4) second scanning periods (including second duty cycles). That is, user 602 can remain seated in first car 604a for a period of time long enough that WLAN Connection Enhancer 292 can perform one or more successive scan cycles after fourth successive scan cycle (corresponding to scan result 322d) and before fifth successive scan cycle (corresponding to scan result 322e). For ease of explanation only, in passenger train scenario 600, the scan results 322b-322d of successive scan cycles represent three (3) most recent scan results 322 before the fifth successive scan cycle corresponding to scan result 322e.

In response to generating scan result 322h of eighth successive scan cycle, WLAN Connection Enhancer 292 identifies WiFi AP 672b as the strongest encamped common WiFi AP, and in response, connects WiFi transceiver 268 to WiFi AP 672b (AP2). That is, WLAN Connection Enhancer 292 identifies that four (4) (as an example of the predetermined number 336) of scan results 322e-322h of the most recent successive scan cycles have the same highest value RSSI 654 (namely, $RSSI_{5,2}$, $RSSI_{6,2}$, $RSSI_{7,2}$, and $RSSI_{8,2}$). WLAN Connection Enhancer 292 identifies that those four (4) highest value RSSIs 654 (namely, $RSSI_{5,2}$, $RSSI_{6,2}$, $RSSI_{7,2}$, and $RSSI_{8,2}$) correspond to a particular encamped common WiFi AP having identification 656 (AP2). In passenger train scenario 600, in response to identifying WiFi AP 672b as the new strongest encamped common WiFi AP, WLAN Connection Enhancer 292 connects WiFi transceiver 268 to WiFi AP 672b.

The iterative processes of WLAN Connection Enhancer 292 implemented within passenger train scenario 600 (comprising a passenger train with multiple cars with overlapping WiFi coverage areas) and can be implemented in other similar situations, in which a vendor-provided WiFi network includes multiple wireless connection points that have overlapping WiFi coverage areas. For example, the processes described with reference to passenger train scenario 600 of FIGS. 6A and 6B could be implemented in a shopping mall, an airport, or a vessel (e.g., cruise ship) that is configured with multiple overlapping WiFi coverage areas.

Figure 7:
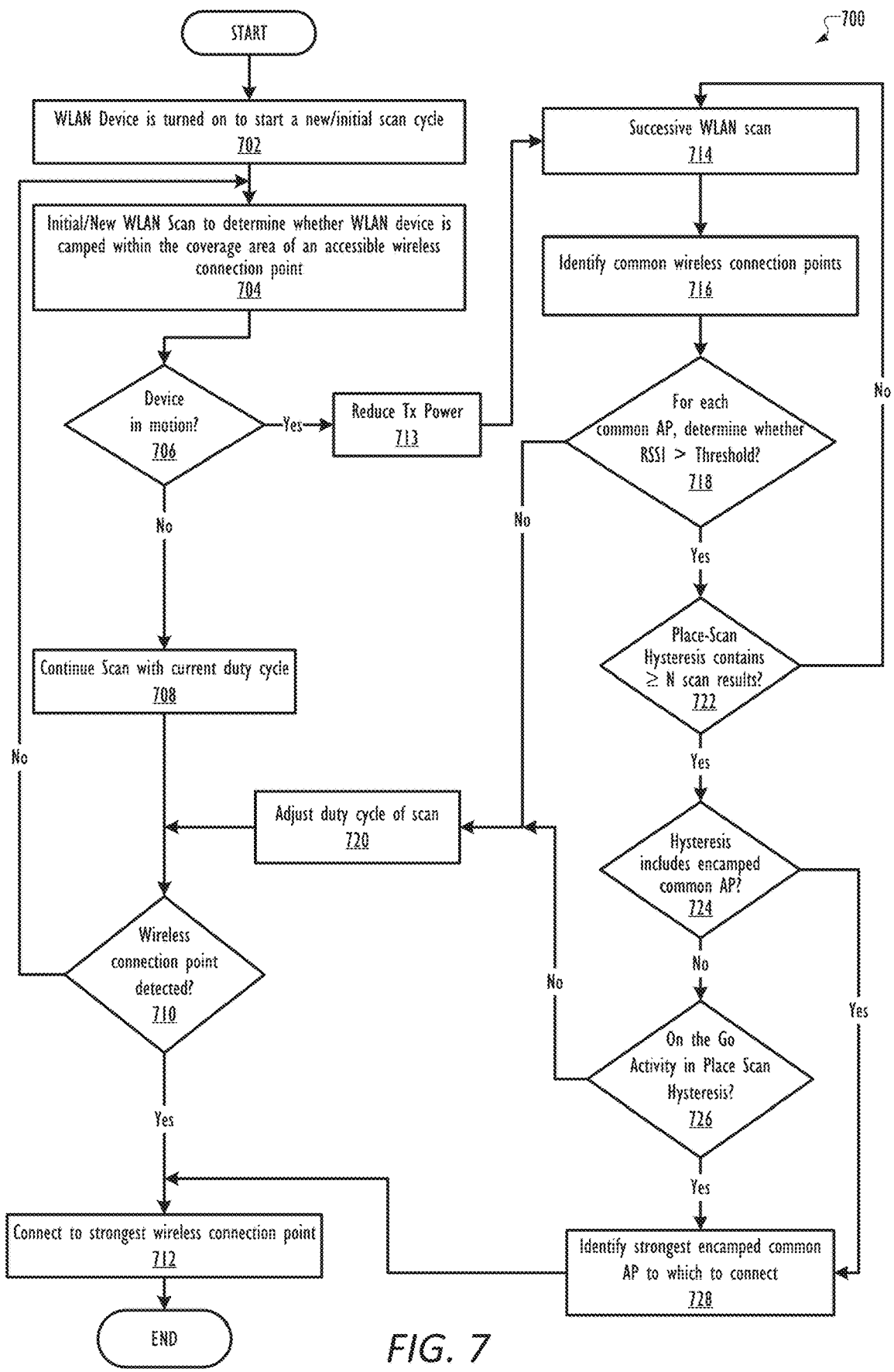
FIG. 7 is a flow chart illustrating a method for selectively connecting to a wireless local area network based on activity recognition, in accordance with one or more embodiments of this disclosure.

With reference now to FIG. 7, there is illustrated a flow chart of a method for selectively connecting to a wireless local area network (WLAN) based on activity recognition associated with motion of a mobile device, in accordance with one or more embodiments of this disclosure. The description of method 700 will be described with reference to the components and examples of FIGS. 1-6C. The operations illustrated in FIG. 7 can be performed by mobile device 200 (FIG. 2) or any suitable device, including one or more functional components of mobile device 200 that provide the described features. One or more of the processes of the methods described in FIG. 7 are generally described as being performed by a processor (e.g., processor IC 205) executing program code associated with WLAN Connection Enhancer 292, which execution involves the use of other components of mobile device 200.

Method 700 begins at start block and proceeds to block 702, at which processor IC 205 initiates a new initial scan cycle. In some embodiments, processor IC 205 initiates a new initial scan cycle in response to powering on mobile device 200. The initial scan cycle has an initial duty cycle.

At blocks 704, processor IC 205 begins a multi-step sub-process of determining whether mobile device 200 is camped within the coverage area (e.g., 408 or 410 of FIG. 4 or 508 of FIG. 5) of an accessible wireless connection point 172. In at least one embodiment, processor IC 205 determines whether mobile device 200 is camped within the coverage area of an accessible wireless connection point 172 by performing (at block 704) an initial scan cycle. In performing the initial scan cycle, processor IC 205 detects a first set of wireless connection points accessible to the wireless communication device. The initial scan cycle iteratively repeats after an initial scanning period. More particularly, processor IC 205 performs each initial scan to detect (e.g., discover) a first set of wireless connection points accessible to mobile device 200.

At decision block 706, processor IC 205 determines whether mobile device 200 is in motion. In some embodiments of block 706, processor IC 205 determines whether mobile device 200 is in motion by detecting that a motion activity event has been received from activity recognition utility 290. The motion activity event indicates motion of mobile device 200. Activity recognition utility 290 sends the motion activity event based on an analysis of signals collected from sensors (e.g., motion sensors 142) of mobile device 200. More particularly, processor IC 205 uses activity recognition utility 290 to identify a category of the motion activity event. For example, if activity recognition utility 290 determines that that mobile device 200 is not in motion, then activity recognition utility 290 may output that device state 304 is the still state 304f. In response to determining that mobile device 200 is not in motion, method 700 proceeds to block 708. As another example, as shown in FIG. 5, activity recognition utility 290 determines that mobile device 200 is in motion, and WLAN Connection Enhancer 192 receives running state 304c as a corresponding motion activity event from activity recognition utility 290. In response to determining that mobile device 200 is in motion, method 700 proceeds to block 713.

Transitioning now to block 708, when the device is not in motion, processor IC 205 continues performing the initial scan with the current duty cycle. At block 708, the current duty cycle can be the initial duty cycle. At decision block 710, after the current duty cycle concludes, processor IC 205 determines whether any wireless connection point 172 was detected during the initial scan. More particularly, processor IC 205 determines whether the first set of wireless connection points accessible to mobile device 200 is a null set or includes at least one wireless connection point 172 detected during the initial scan cycle. In response to determining that no wireless connection point 172 was detected during the initial scan, processor IC 205 both determines that the first set of wireless connection points accessible to mobile device 200 is a null set and returns to block 704 to initiate a new initial scan cycle. By returning to block 704, processor IC 205 iteratively starts a new scan cycle. In at least one embodiment, in response to determinations (at blocks 706 and 724) that mobile device 200 is in motion and that place-scan hysteresis 320 does not include an encamped common wireless connection point, processor IC 205 avoids/defers connecting WiFi transceiver 268 to an accessible wireless connection point 172. More particularly, in order to avoid/defer connecting WiFi transceiver 268 to an accessible wireless connection point 172, processor IC 205 determines (at block 710) that no wireless connection point 172 was detected during the initial scan, in response to determinations (at blocks 706 and 724) that mobile device 200 is in motion and place-scan hysteresis 320 does not include an encamped common wireless connection point.

At block 712, in response to determining that at least one wireless connection point 172 was discovered or detected during the initial scan, processor IC 205 connects a transceiver (e.g., WiFi transceiver 268 or Bluetooth transceiver 224) of mobile device 200 to one wireless connection point 172 selected from among the at least one detected wireless connection point(s) 172. More particularly, processor IC 205 selects to connect to a strongest wireless connection point, selected from among the detected wireless connection point(s) 172. Processor IC 205 selects the strongest wireless connection point based on whether motion of mobile device 200 was detected at block 706. In at least one embodiment, if no motion mobile device 200 was detected at block 706, then processor IC 205 selects the strongest wireless connection point based on having a highest RSSI among the detected wireless connection point(s) 172. As described more particularly below with reference to blocks 713-728, if motion of mobile device 200 was detected at block 706, then processor IC 205 selects the strongest wireless connection point based on an analysis of successive scan results 322. Following block 712, method 700 ends at the end block.

In at least one embodiment, processor IC 205 uses a transceiver 268 to adjust (at block 713) the transmit power output by mobile device 200 for a successive scan cycle. It is understood that processor IC 205 can adjust the transmit power output prior to, concurrently with, or after initiating each successive scan cycle. As an example, in view of FIG. 6C, if processor IC 205 reduced the transmit power level ($TX_8$) of the eighth successive scan cycle to 50%, compared to 100% transmit power level for previous successive scan cycles, then the eight successive set of wireless connection points only detect AP2, AP3, and AP1. At a 50% reduction, the transmit power level ($TX_8$) of the eighth successive scan cycle reduction may not be powerful enough to detect AP4 and AP5 that are located farther away with weaker RSSIs ($RSSI_{8,4}$ and $RSSI_{8,5}$).

At block 714, processor IC 205 initiates a successive scan cycle to detect a successive set of wireless connection points accessible to mobile device 200. The successive scan cycle iteratively repeats after a second scanning period that is different from the initial scanning period. In at least one embodiment of block 714, processor IC 205 (using WiFi transceiver 268) actively scans for beaconing WiFi APs 672 and completes the ON portion (i.e., second duty cycle) of the second scanning period.

At block 716, processor IC 205 identifies at least one common wireless connection point that is a member of both the first set of wireless connection points and the successive set of wireless connection points.

At decision block 718, for each of the at least one common wireless connection point that is identified, processor IC 205 determines whether a received signal strength indicator (RSSI) of the common wireless connection point is within an acceptable range. For example, the acceptable range can be greater than an RSSI threshold (i.e., $RSSI_{Actual}$>Threshold).

At block 720, for each common wireless connection point that has an RSSI that is outside the acceptable range, processor IC 205 adjusts the second duty cycle, namely, the second duty cycle of the next successive scan. More particularly, processor IC 205 adjusts the second duty cycle based on the category of the motion activity event, which category was identified at block 706. In response to determining that mobile device 200 is moving at a high or increasing speed, processor IC 205 may shorten the second duty cycle 326 (or second scanning period 334) to repeat the successive scans more frequently. The period of time mobile device 200 takes to pass through a WLAN coverage area without stopping shortens if mobile device 200 is inside a vehicle (e.g., 400 of FIG. 4) that is accelerating or traveling at a high velocity. When traveling at a high velocity, a single wireless connection point 172 is less likely to produce an RSSI within the acceptable range of consecutive WLAN scans performed by mobile device 200. In light of these probabilities, in order to reduce battery power consumption, processor IC 205 uses WLAN Connection Enhancer 192 to perform successive WLAN scans less frequently (e.g., every 60 seconds instead of every 30 seconds) when motion sensors 142 indicate a mobile device 200 is moving at a high speed or is in in-vehicle state 304a. Similarly, in response to determining that mobile device 200 has a low or decreasing speed, processor IC 205 may shorten the second duty cycle 326 (or second scanning period 334) to repeat the scans more frequently (e.g., every 20 or 30 seconds instead of every 60 seconds). For example, processor IC 205 uses WLAN Connection Enhancer 192 to perform successive WLAN scans more frequently when motion sensors 142 indicate mobile device is moving at a low speed or is in walking state 304d.

At decision block 722, for each common wireless connection point that has an RSSI that is within the acceptable range, processor IC 205 determines whether place-scan hysteresis 320 (FIG. 3) includes a scan result from each of a predetermined number 336 (N) of most recent iterations of successive scan cycles. In response to determining that place-scan hysteresis 320 includes less than N scan results from each of the most recent iterations of successive scan cycles, method 700 returns to block 714 for iterating another successive scan cycle. In response to determining that place-scan hysteresis 320 includes N scan results from each of the most recent iterations of successive scan cycles, method 700 proceeds to block 724.

At block 724, processor IC 205 determines whether place-scan hysteresis 320 includes an encamped common wireless connection point within each of the N scan results. More particularly, processor IC 205 determines that a common wireless connection point is encamped based on WLAN Connection Enhancer 192 identifying that same common wireless connection point in each of the N successive scan results within place-scan hysteresis 320. In response to determining that the place-scan hysteresis 320 does not include an encamped common wireless connection point within each of the N scan results, method 700 proceeds to block 726.

At decision block 726, processor IC 205 determines whether successive scan results within place-scan hysteresis 320 indicates activity associated with mobile device 200 being on-the-go. In response to determining that place-scan hysteresis 320 indicates activity associated mobile device 200 being on-the-go, method 700 proceeds to block 728. In response to determining that place-scan hysteresis 320 does not indicate activity associated with mobile device 200 being on-the-go, method 700 proceeds to block 720. WLAN Connection Enhancer 292 determines that WiFi network conditions are not relatively stable such that mobile device 200 cannot access the Internet reliably via WiFi based in part on the determination that no encamped common AP was identified (at block 724), and based in part on the determination that the motion of mobile device 200 does not exhibit quickly entering and exiting a WiFi coverage area. After decision block 726, by returning to block 720 (followed by block 710) processor IC 205 is enabled to determine whether to allow or to avoid/defer connecting to one from among the first set of wireless connection points that was detected (at block 704) during the initial scan cycle.

Returning to decision block 724, in response to determining that the place-scan hysteresis 320 includes an encamped common wireless connection point within each of the N scan results, processor IC 205 determines that mobile device 200 is camped within the coverage area 608*a* of the encamped common wireless connection point 672*a*, and method 700 proceeds to block 728.

At block 728, processor IC 205 identifies a strongest encamped common wireless connection point from among the at least one encamped common wireless connection point. The strongest encamped common wireless connection point is an encamped common wireless connection point that has the highest RSSI in the N successive scan results within place-scan hysteresis 320. Method 700 proceeds from block 728 to block 712, at which processor IC 205 connects a transceiver of mobile device 200 to the strongest encamped common wireless connection point.

In the above-described flowchart of FIG. 7, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A mobile wireless communication device comprising:
   at least one wireless communication transceiver; and
   a processor coupled to the transceiver, and which executes program code that enables the mobile wireless communication device to:
   determine whether the wireless communication device is camped within a coverage area of an accessible wireless connection point while the wireless communication device is in motion, wherein the wireless connection point is not a cellular network node;
   in response to determining the wireless communication device is camped within the coverage area of an accessible wireless connection point while the wireless communication device is in motion, selectively connect the transceiver to the accessible wireless connection point; and in response to determining the wireless communication device is not camped within the coverage area of an accessible wireless connection point while the wireless communication device is in motion, defer connecting the transceiver to the accessible wireless connection point.

2. The wireless communication device of claim 1, wherein the program code further enables the device to determine whether the wireless communication device is in motion by:
   detecting that a motion activity event has been received from an activity recognition utility, the motion activity event indicating motion of the wireless communication device, the activity recognition utility sending the motion activity event based on an analysis of signals collected from sensors of the wireless communication device.

3. The wireless communication device of claim 1, wherein the program code further enables the device to
   determine whether the wireless communication device is camped within the coverage area of an accessible wireless connection point by enabling the device to:
      perform an initial scan cycle that detects a first set of wireless connection points accessible to the wireless communication device;
      detect that a motion activity event has been received;
      in response to detecting that the motion activity event has been received, initiate a successive scan cycle that detects a successive set of wireless connection points accessible to the wireless communication device;
      identify at least one common wireless connection point that is a member of both the first set of wireless connection points and the successive set of wireless connection points; and
      for each of the at least one common wireless connection point that is identified:
         identify an encamped common wireless connection point that is within each of the successive set of wireless connection point; and
         selectively connect the transceiver to at least one encamped common wireless connection point.

4. The wireless communication device of claim 3, wherein the program code further enables the device to:
   generate a place-scan hysteresis, wherein each scan result includes:
      the successive set of wireless connection points;
      a received signal strength indicator (RSSI) of each of the at least one common wireless connection point; and
      an identification of which common wireless connection point among the at least one common wireless connection point has a highest RSSI;
   determine whether the RSSI of the common wireless connection point is within an acceptable range;
   in response to the RSSI of the common wireless connection point being within the acceptable range, determine whether the place-scan hysteresis includes a scan result from each of a predetermined number (N) of most recent iterations of successive scan cycles; and
   in response to determining that the place-scan hysteresis includes a scan result from N of the most recent successive scan cycles, determine that the wireless communication device is camped within the coverage area of the encamped common wireless connection point.

5. The wireless communication device of claim 4, wherein the program code further enables the device to:
   identify a strongest encamped common wireless connection point from among the at least one encamped common wireless connection point, the strongest encamped common wireless connection point being an encamped common wireless connection point that has the highest RSSI in the N scan results; and
   selectively connect to the strongest encamped common wireless connection point.

6. The wireless communication device of claim 3, wherein the program code further enables the device to:
   identify a category of the motion activity event;
   adjust the second duty cycle based on the category of the motion activity event; and
   adjust, by the transceiver, transmit power output by the wireless communication device for the successive scan cycle.

7. A method comprising:
   determining, via a processor of a mobile wireless communication device, whether the mobile wireless communication device is camped within a coverage area of an accessible wireless connection point while the wireless communication device is in motion, wherein the wireless connection point is not a cellular network node;
   in response to determining the wireless communication device is camped within the coverage area of an accessible wireless connection point while the wireless communication device is in motion, selectively connecting a transceiver of the wireless communication device to the accessible wireless connection point; and
   in response to determining the wireless communication device is not camped within the coverage area of an accessible wireless connection point while the wireless communication device is in motion, defer connecting the transceiver to the accessible wireless connection point.

8. The method of claim 7, further comprising determining whether the wireless communication device is in motion by:
   detecting that a motion activity event has been received from an activity recognition utility, the motion activity event indicating motion of the wireless communication device, the activity recognition utility sending the motion activity event based on an analysis of signals collected from sensors of the wireless communication device.

9. The method of claim 7, further comprising:
   determining whether the wireless communication device is camped within the coverage area of an accessible wireless connection point by:
      performing an initial scan cycle that detects a first set of wireless connection points accessible to the wireless communication device;
      detecting that a motion activity event has been received;
      in response to detecting that the motion activity event has been received, initiating a successive scan cycle that detects a successive set of wireless connection points accessible to the wireless communication device;
      identifying at least one common wireless connection point that is a member of both the first set of wireless connection points and the successive set of wireless connection points; and
      for each of the at least one common wireless connection point that is identified:

identifying an encamped common wireless connection point within each of a predetermine number (N) scan results; and
selectively connecting the transceiver to at least one encamped common wireless connection point.

10. The method of claim 9, further comprising:
generating a place-scan hysteresis wherein each scan result includes:
the successive set of wireless connection points;
a received signal strength indicator (RSSI) of each of the at least one common wireless connection point; and
an identification of which common wireless connection point among the at least one common wireless connection point has a highest RSSI;
determining whether the RSSI of the common wireless connection point is within an acceptable range;
in response to the RSSI of the common wireless connection point being within the acceptable range, determining whether the place-scan hysteresis includes a scan result from each of the N most recent iterations of successive scan cycles; and
in response to determining that the place-scan hysteresis includes a scan result from N of the most recent successive scan cycles, determining that the wireless communication device is camped within the coverage area of the encamped common wireless connection point.

11. The method of claim 10, further comprising:
identifying a strongest encamped common wireless connection point from among the at least one encamped common wireless connection point, the strongest encamped common wireless connection point being an encamped common wireless connection point that has the highest RSSI in the N scan results; and
selectively connecting to the strongest encamped common wireless connection point.

12. The method of claim 9, further comprising:
identifying a category of the motion activity event;
adjusting the second duty cycle based on the category of the motion activity event; and
adjusting, by the transceiver, transmit power output by the wireless communication device for the successive scan cycle.

13. A computer program product comprising:
a non-transitory computer readable storage device;
program code on the computer readable storage device that when executed by a processor associated with a mobile wireless communication device, the program code enables the wireless communication device to provide the functionality of:
determining whether the wireless communication device is camped within a coverage area of an accessible wireless connection point while the wireless communication device is in motion, wherein the wireless connection point is not a cellular network node;
in response to determining the wireless communication device is camped within the coverage area of an accessible wireless connection point while the wireless communication device is in motion, selectively connecting a transceiver of the wireless communication device to the accessible wireless connection point; and
in response to determining the wireless communication device is not camped within the coverage area of an accessible wireless connection point while the wireless communication device is in motion, defer connecting the transceiver to the accessible wireless connection point.

14. The computer program product of claim 13, wherein the program code comprises program code that, when executed by the processor, enables the wireless communication device to provide the functionality of:
determining whether the wireless communication device is camped within the coverage area of an accessible wireless connection point by:
performing an initial scan cycle that detects a first set of wireless connection points accessible to the wireless communication device;
detecting that a motion activity event has been received;
in response to detecting that the motion activity event has been received, initiating a successive scan cycle that detects a successive set of wireless connection points accessible to the wireless communication device;
identifying at least one common wireless connection point that is a member of both the first set of wireless connection points and the successive set of wireless connection points; and
for each of the at least one common wireless connection point:
identifying an encamped common wireless connection point within each of a predetermined number (N) scan results; and
selectively connecting the transceiver to at least one encamped common wireless connection point.

15. The computer program product of claim 14, wherein the program code comprises program code that, when executed by the processor, enables the wireless communication device to provide the functionality of:
generating a place-scan hysteresis, wherein each scan result includes:
the successive set of wireless connection points;
an RSSI of each of the at least one common wireless connection point; and
an identification of which common wireless connection point among the at least one common wireless connection point has a highest RSSI;
determining whether the RSSI of the common wireless connection point is within an acceptable range;
in response to the RSSI of the common wireless connection point being within the acceptable range, determining whether the place-scan hysteresis includes a scan result from each of the N most recent iterations of successive scan cycles; and
in response to determining that the place-scan hysteresis includes a scan result from N of the most recent successive scan cycles, determining that the wireless communication device is camped within the coverage area of the encamped common wireless connection point.

16. The computer program product of claim 14, wherein the program code comprises program code that, when executed by the processor, enables the wireless communication device to provide the functionality of:
identifying a strongest encamped common wireless connection point from among the at least one encamped common wireless connection point, the strongest encamped common wireless connection point being an encamped common wireless connection point that has the highest RSSI in the N scan results; and selectively connecting to the strongest encamped common wireless connection point.

17. The computer program product of claim 13, wherein the program code comprises program code that, when executed by the processor, enables the wireless communication device to provide the functionality of:
identifying a category of the motion activity event; and
adjusting, by the transceiver, at least one of:
a second duty cycle based on the category of the motion activity event; and
transmit power output by the wireless communication device for a successive scan cycle.

18. The wireless communication device of claim 3, wherein the initial scan cycle and the successive scan cycle are iteratively repeated after a respective one of an initial duty cycle and a second duty cycle that is different from the initial duty cycle.

19. The method of claim 9, wherein the wireless connection point is one of a wireless fidelity (WiFi) access point and a Bluetooth connection point, and the wireless connection point supports a respective one of a WiFi connection protocol and a Bluetooth wireless connection protocol.

20. The method of claim 9, further comprising iteratively repeating the initial scan cycle and the successive scan cycle after a respective one of an initial duty cycle and a second duty cycle that is different from the initial duty cycle.

* * * * *